US009451451B2

(12) United States Patent
Chow et al.

(10) Patent No.: US 9,451,451 B2
(45) Date of Patent: Sep. 20, 2016

(54) SYSTEM FOR REGULATING WIRELESS DEVICE OPERATIONS IN WIRELESS NETWORKS

(71) Applicant: TUTELA TECHNOLOGIES LTD., Vancouver (CA)

(72) Inventors: Brennen Chow, Port Coquitlam (CA); Hunter MacDonald, Keswick Ridge (CA); David Yarish, Victoria (CA); Thomas Darcie, Victoria (CA); Stephen Neville, Victoria (CA); Anthony Sean Kroeker, Victoria (CA)

(73) Assignee: TUTELA TECHNOLOGIES LTD., Victoria, BC (CA)

( * ) Notice: Subject to any disclaimer, the term of this patent is extended or adjusted under 35 U.S.C. 154(b) by 171 days.

(21) Appl. No.: 14/348,208

(22) PCT Filed: Sep. 28, 2012

(86) PCT No.: PCT/CA2012/000895
§ 371 (c)(1),
(2) Date: Mar. 28, 2014

(87) PCT Pub. No.: WO2013/044359
PCT Pub. Date: Apr. 4, 2013

(65) Prior Publication Data
US 2014/0315536 A1 Oct. 23, 2014

Related U.S. Application Data

(60) Provisional application No. 61/652,314, filed on May 28, 2012, provisional application No. 61/541,625, filed on Sep. 30, 2011.

(51) Int. Cl.
*H04W 8/24* (2009.01)
*H04W 8/18* (2009.01)
(Continued)

(52) U.S. Cl.
CPC .............. *H04W 8/245* (2013.01); *H04L 67/30* (2013.01); *H04W 4/001* (2013.01); *H04W 4/02* (2013.01);
(Continued)

(58) Field of Classification Search
CPC ............ H04L 67/30; H04W 28/0215; H04W 28/0247; H04W 28/0242; H04W 4/001; H04W 4/02
See application file for complete search history.

(56) References Cited

U.S. PATENT DOCUMENTS 8,000,276 B2 8/2011 Scherzer et al.
8,126,476 B2 2/2012 Vardi et al.
(Continued)

OTHER PUBLICATIONS

Bridgewater Systems: "Sharing the Load: The Value of Subscriber, Service, and Policy Control in Mobile Data Traffic Offload" Internet Citation, May 2011, URL http://www.bridgewatersystems.com/Assets/Downloads/Whitepapers/Bridgewater%20-%20Sharing%20the%20Load_May11.pdf.
(Continued)

*Primary Examiner* — Barry Taylor
(74) *Attorney, Agent, or Firm* — Marks & Clerk

(57) ABSTRACT

A system for managing the device operation rules that govern a device's operation, includes a profiling server configured to receive data from one or more data sources and a processor to aggregate and analyze the received data to dynamically generate profiles for distribution to a plurality of devices. The devices, which are in communication with the profiling server, being responsive to profiles generated by the profiling server to create, update, or modify the said operation rules and communicate with the profiling server the performance of the said profiles, the said rules, and/or the said device. The system allows the device operation rules to be dynamically updated in accordance with changing network conditions, and also can provide analytics information to third parties.

20 Claims, 20 Drawing Sheets

(51) Int. Cl.
  *H04L 29/08* (2006.01)
  *H04W 4/00* (2009.01)
  *H04W 4/02* (2009.01)
  *H04W 28/02* (2009.01)
  *H04W 84/04* (2009.01)

(52) U.S. Cl.
  CPC ........... *H04W 8/18* (2013.01); *H04W 28/0215* (2013.01); *H04W 28/0242* (2013.01); *H04W 28/0247* (2013.01); *H04W 84/045* (2013.01)

(56) References Cited

U.S. PATENT DOCUMENTS

2008/0181184 A1*  7/2008  Kezys .................. H04W 16/08
                                                                  370/338
2011/0286437 A1*  11/2011  Austin ................... H04W 4/02
                                                                  370/338

OTHER PUBLICATIONS

Green Packet Berhad: "Greenpacket Launches 3GPP-ANDSF Compliant Dynamic Data Offload Solution" Internet Citation, Apr. 29, 2011, URL: http://www.greenpacket.com/news_room/nr_01-030511.html.

Corvaja, Roberto, "QoS Analysis in Overlay Bluetooth-WiFi Networks with Profile-Based Vertical Handover". IEEE Transactions on mobile computing, vol. 5, No. 12, Dec. 2006, pp. 1679-1690.

* cited by examiner

| Policy Action - 1001 | Conditions - 1005 | | | | |
|---|---|---|---|---|---|
| | Signal Strength A | Signal Strength B | Application Being Used - 1002 | Time of Day - 1003 | User - 1004 |
| Connect to Access Point A | AA - 906 | AB - 907 | YouTube | 22:00-23:00 GMT | Unique ID |
| Connect to Access Point B | BA - 908 | BB - 909 | Skype | 12:00-13:00 GMT | Unique ID |
| Don't Connect to Access Point A | BA - 908 | BB - 909 | Skype | 23:00-24:00 GMT | Unique ID |
| Don't Connect to Access Point B | AA - 906 | AB - 907 | YouTube | 21:00-22:00 GMT | Unique ID |

Connection Matrix - 1000

Figure 10

| Measure Type - 1100 | Weighting - 1101 | Average - 1102 | Measured Value - 1103 | % From Avg - 1104 |
|---|---|---|---|---|
| Throughput | 1 | 900 Kbps | 1000 | 11 |
| Latency | 1 | 60 ms | 50 | 16.6 |

$$1105 - Value = \frac{\sum^{N}(Measure\ Weight \times Measure\ \%\ from\ AVG)}{\sum^{N}(Measure\ Weight)}$$

Eg:

$$1105 - Value = \frac{(1 \times 11) + (1 \times 16.6)}{(1) + (1)} = 13.8$$

| | Class 1 - 1106 | Class 2 - 1107 | Class 3 - 1108 | Class 4 - 1109 |
|---|---|---|---|---|
| Value - 1105 | >50 | 50 to 0 | 0 to -50 | <-50 |

Figure 11

| Measure Type - 1200 | Weighting - 1201 | Acceptable or Physical Limit - 1202 | Measured Value - 1203 | % From Limit (negative value if limits have been exceeded) - 1204 |
|---|---|---|---|---|
| Congestion measure #1 | 1 | X | (9/10)*X | 10 |
| Congestion measure #2 | 1 | Y | (8/10)*Y | 20 |

$$1205 - Value = \frac{\sum^N (Measure\ Weight \times Measure\ \%\ from\ AVG)}{\sum^N (Measure\ Weight)}$$

Eg:

$$1205 - Value = \frac{(1 \times 10) + (1 \times 20)}{(1) + (1)} = 15$$

| | Class 1 - 1206 | Class 2 - 1207 | Class 3 - 1208 | Class 4 - 1209 |
|---|---|---|---|---|
| Value - 1105 | >50 | 50 to 0 | 0 to -50 | <-50 |

Figure 12

| For a particular device, access point, and access network | | |
|---|---|---|
| Congestion Class Value - 1205 | Expected Connection Throughput(kbps) - 1302 | Expected Connection Latency(ms) - 1303 |
| <-50 | <500 | >80 |
| 0 to -50 | 500-800 | 80-65 |
| 0 to 50 | 800-1100 | 65-50 |
| >50 | >1100 | <50 |

Mapping - 1300

Figure 13

SYSTEM FOR REGULATING WIRELESS DEVICE OPERATIONS IN WIRELESS NETWORKS

CROSS REFERENCE TO RELATED APPLICATION

This application is related to U.S. provisional application No. 61/541,625, filed Sep. 30, 2011, and U.S. provisional application No. 61/652,314 filed May 28, 2012, the contents of which are herein incorporated by reference.

FIELD OF THE INVENTION

This embodiment relates generally to the field of policy control in automated systems, and in particular to an advanced policy control plane for managing the activities and functional operations of policy driven devices, and more particularly to a system for regulating wireless device operations in wireless networks.

BACKGROUND OF THE INVENTION

Wireless service providers are experiencing an exponential growth in wireless data usage. This has left wireless service providers with the sizable task of coping with unprecedented levels of infrastructure strain while simultaneously facing an ever-increasing gap between data usage and generated revenue. This ongoing congestion concern has been exacerbated by the growing use of devices (such as smartphones, data heavy applications, and USB dongles), which ultimately impact customer quality of service. As a result, service providers are now turning to new and innovative solutions for maintaining client service quality while minimizing incurred costs.

One such wireless service provider solution involves bypassing congested and expensive cellular networks by connecting to and streaming data over the growing number of non-cellular access points, such as WiMAX and WLAN. This process of transferring cellular network connections and data flows to other networks to reduce congestion is known as data offload. Ultimately, this requires a connection manager on a device, governed by offloading policy, to facilitate the transfer of data traffic and network connections between cellular and non-cellular networks.

Many data offload and policy enforcement processes rely heavily on knowing the device's location. It is one of the most common measures for determining whether or not a particular policy should be enforced. However, existing methods for determining device location have some inherent issues. GPS radios used in devices drain batteries quickly and GPS locations are often inaccurate, especially in dense urban areas. Finding device location based on a triangulation process with nearby cellular towers or Wi-Fi access point signals are likewise often inaccurate.

Inaccuracies in device location are problematic for data offloading solutions that attempt to make very precise decisions about when and how wireless devices should transition over to Wi-Fi networks. Hence, this embodiment proposes a novel method of servicing this need without needing to geographically locate the wireless device. Instead, the embodiment describes data offloading processes that leverages a notion of location relative to the wireless environment.

In general, the term connection management is used to denote the decision process undertaken within each wireless device to determine which of the available physical wireless networks or network access points it will connect to for its network services at any given point in time, as well as the subsequent connection enforcement processes. Currently, connection management is performed either:
 direct user control.
 connection decisions enacted by a user installed connection management application acting under the direction of user instantiated connection policies.
 in conjunction with a network-level offload controller that downloads (or pushes) connection policies to the wireless device's installed connection management application. Offload controllers are usually situated within a service provider's core network and govern the timing, content, and delivery of wireless service provider policies. For example to mitigate network overload events or manage other network quality of service issues, i.e., as when 3G/4G carriers offload subscribers to available IEEE 802.11x access points to manage network loads within the 3G/4G network.

A policy is a set of rules or a course/principle of action to guide or govern decisions, functionality, or operation of a device.

Systems designed to manage the network connections of wireless devices operate based on connection policies. These outline the actions to be taken when certain conditions are met. Many of these systems make use of a policy type that sets a prioritized list of networks for connections. This lets service providers ensure that their access points are always preferred by their clients. It also allows them to set preferred roaming partners. For wireless devices users, it provides a mechanism for prioritizing the use of known home or work access points.

As an example, a network prioritization policy may list the following:
 1. User's self defined access points.
 2. Home service provider's owned access points.
 3. 1st preferred roaming partner
 4. 2nd preferred roaming partner Offloading policy must be appropriately enforced by connection managers to ensure that data offload does not interrupt the device's user experience, and that their expected quality of service is provided on the new access network. State-of-the-art in offloading presupposes relatively static policies that are structured to manage issues within the context of a specific communications network, where the access points to which wireless devices connect to comprise one aspect of this network.

The current state-of-the-art does not comprise the development of advanced offloading profiles based on:
 a composite of information collected from a multiplicity of networks and network access points.
 a composite of information available from 3rd party sources (i.e., non-network and non-wireless device based information sourced).
 a composite of information available from a multiplicity of wireless devices, whether or not they are receiving wireless network services.
 the use of these information sources to assess, guide, or otherwise inform the creation, modification, or restructuring of offload decision polices.

To date, offload controllers have been limited in scope and have not fully leveraged the improvements to policy enforcement processes that are achievable through the dynamic analysis of operations data from all related devices and systems. The enhancement of policy enforcement through data aggregation and analysis is a core area of focus of the embodiment. Specifically, the area of interconnected wireless networks, has been under-explored due to the technical complexity and required advanced understanding of how inter-device and server/cloud collaboration can be leveraged to achieve measurable offload controller improvements through an analytic feedback loop. This feedback loop could be used, for example, to aggregate offload controller data that may then be processed and returned to the offload controller in the form of profiles, which are useful in subsequent policy enforcement decisions. It is clear that offload controllers have not begun to realize their full potential.

Most prior art depicts offload controllers having client-side implementations with no server collaboration, inter-device data exchange, or interaction with a policy-managing interface, such as a policy-managing server. Some offload controllers use advanced processes and methods to determine how and when policies are best enforced, but these policies do not change dynamically with network, device, or user conditions.

For endpoint wireless devices making a connection to a network, the notion of monitoring, collecting and reporting connection data and/or attributes for use in analyzing user behavior and device connectivity efficiencies may be considered. However, the data collected is not used to modify, inform, or generate offload controller policy.

Prior art/publications generally view profiles as being ostensibly static client-based descriptions set by users, service providers or OEMs. Some prior art discusses dynamic profile generation; however these publications have failed to explore how dynamic profiles may be generated in such a way that they may add value to the algorithmic processes being performed by offload controllers and policy managers. Instead they simply describe collecting data. There is no discussion of then distributing the resulting analytics to provide system improvements to the data collection source entities. ANDSF, HotSpot 2.0, GAS, ANQP, IEEE 802.11u, IEEE 802.11v, pre-loaded Connection Managers and systems without direct connection manager to policy server communication all support policies for setting a prioritized list of networks or access points to connect to. However to date prioritization policies are almost exclusively being used to select a prioritized list of access networks. Most commonly, connection managers are also only provided with one or two prioritization levels. One is reserved for the wireless device users owned or trusted access points. The other is for the set of access points owned by the wireless device's wireless service provider. If neither of those options is available, the connection manager must rely on direct user input to select appropriate network connections. Despite this, standards like ANDSF and IEEE 802.11v currently support over 250 unique priority levels of access networks or access points that can be enforced through connection policy.

In systems where the policy server communicates directly with access points instead of connection managers, network prioritization policies are used to restrict access to certain access points in order to force a device onto other access points within the same network. This is largely done for load balancing purposes within a single network. Network prioritization policies in this area are not being used to improve data offloading processes, where data offload generally refers to having wireless devices switch between GSM and small cell networks to alleviate congestion events.

Service providers currently rely on network analytics for everything from engineering operations planning to designing targeted marketing campaigns. It is important to note that current network analytics mainly rely on network-side measures for analysis; they do not capture information from the wireless device itself, and hence they produce network-side measures. These network-side measures are not always reflective of what is actually being experienced by the device. For this reason, performance readings measured directly on the device are more reflective of what the user is actually experiencing than readings taken anywhere else. Many issues give rise to the differences between network-side and device-side readings, one of which is wireless signal interference. It is also important to note that current network analytics are not designed specifically for the needs of offloading solutions or the users of offloading solutions.

Existing offload solution control interfaces for service providers, or dashboards, are quite basic. They allow the service provider to select the policies they would like to push to devices when certain location and network congestion conditions are met. They do not possess any network assessment, policy/offloading solution assessment, or informed policy design functions. Hence, these Dashboard interfaces are not overly functional or advanced.

Cellular wireless communication networks include, but are not limited to, such protocols as: Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), and CDMA-2000.

In addition, wireless communication devices may also include multiple transceivers that use different communication protocols. Furthermore, the transceiver may use other protocols such as: wireless local area network (WLAN), wide area network (WAN), or local area network (LAN) protocols such as the Industrial Electrical and Electronics Engineers (IEEE) 802.11, 802.16 and 802.18 standards, Bluetooth and infrared.

The scope of the present embodiment is not limited by the types, the number of, or the frequency of the communication protocols that may be used on a wireless communication device.

It will be understood that the embodiment is also applicable to other types of policy-driven devices or machine-to-machine systems.

SUMMARY OF THE INVENTION

According to the present invention there is provided a system for regulating wireless device operation in wireless networks, comprising: one or more profiling servers configured to receive data from one more data sources and comprising one or more processors configured to aggregate and analyze the received data to dynamically generate profiles for distribution by the profiling server(s) to a plurality of wireless devices; and wherein the wireless device operation(s) are responsive to said profiles; and; wherein said wireless device(s) are configured to communicate data relating to said wireless device operations back to the profiling server(s).

In one embodiment the profiling clients are in communication with the profiling server.

As used herein "wireless device operation" refers to the manner in which the device establishes a wireless link with an external entity, such as a wireless access point or cellular network, for example.

Embodiments of the invention make use of a novel way in which advanced profiles may be dynamically generated and used for the purpose of enhancing overall device performance. In this case, performance enhancements are achieved by a process of informing, modifying, assessing, or generating device policies using advanced profiles. In the context of this application, the term modify is chosen to refer to policy manipulation, providing information to policy generating processes, managing policies, generating policies, or any such process or mechanism that affects policy. These specific processes may be performed by a device, or an advanced profiling client working in conjunction with either the managing server depending on the embodiment.

An advanced profile is defined as possibly consisting of, but not limited to, aggregate, summarized, statistically analyzed, or otherwise processed data as well as detailed descriptions of many of the most important policy enforcement and policy generation logic inputs.

As a simple example related to connection managers, an access point profile may be generated by the analytic process of aggregating and averaging the latency and throughput levels being experienced by all participating devices and network probes currently connected to that network.

This embodiment dynamically generates profiles at the server and network level using the composite set of information amalgamated from a plurality of participating components on a plurality of participating networks, as well as additional information that cannot be provided by the set of devices, device controllers, access points, policy managers, service provider databases, or third party data sources.

This embodiment's dynamic profile generation further provides unique ways in which policies may be selectively used and applied. By performing analytical comparisons of profiles at the network level, users' policies may be differentiated and custom designed for users to be most appropriate for their particular profile or circumstance. For clarity, this is the process of comparing profiles in order to dynamically develop differentiated device policies that are selectively applied to users. As an example, consider a wireless service provider who would like to use connection managers to offload only the top 20% of data users. This requires centrally amalgamating all user data usage profiles, and then comparing them to determine who belongs to the top 20% of data users. Once this set is identified, this information may be tied to that set's advanced user profiles and service providers may take advantage of policies that only indicate that only this set should begin to offload data.

This embodiment views profiles as being entities that dynamically evolve as more data is collected; therefore they are not static. This embodiment further generates profiles using a server across networks, as opposed to the device level, so as to incorporate a richer, composite set of external information that is not usually available at the device level due to the large data set that would need to be transmitted. Therefore, client only advanced profile generation is untenable.

Connection managers and offload solutions require more advanced control interfaces, or dashboards, than what is currently available. Offload control dashboards currently lack the ability to let users understand the effects of their policies or design improved policies. This embodiment achieves this advancement by merging customized network analytic systems for offload with the control dashboards of offload solutions. The result is an integrated analytics and control dashboard that achieves new capabilities and benefits:

1. Service providers are aware of the advantages of using device-view measures in network analysis. These measures are often more reflective of user experience than readings taken at the network level. However, device-view measures are difficult to obtain. Extracting them requires having wireless service provider controlled software installed on wireless devices. Connection managers, which are wireless service provider controlled software systems, then provide an opportunity to collect this higher quality device-view information.
2. Service providers and offload solution managers wireless service providers are hesitant to implement data offloading solutions because wireless service providers lack the network visibility to know how their policies and enforced network switches affect customers. For this reason it is useful for connection managers and offload solutions to be integrated into network analysis systems so that analytics can be performed on how data offloading policies have performed and how they are being used by connection managers.
3. Service providers must design appropriate offloading policies for their offloading solutions. This is a difficult task without the appropriate information to guide this design process. This then is even more reason to integrate network analytics with data offloading solutions. While designing policies, service providers can review an assessment of how their networks would be expected to perform if that specific policy was implemented. As well as providing an interface for "what if" analysis of newly designed policies, the system would also provide suggested new policies that are likely to most efficiently achieve the wireless service provider's desired results.

Hence, embodiments of the invention go beyond the joint capabilities of normal network analytics systems and offloading solution dashboards. The embodiments are capable of depicting a more accurate view of networks, providing an interface for informed policy assessment, and providing an interface for information policy design. A dashboard interface provides an interactive tool to those implementing this embodiment that further improves control, policy generation/distribution, and achieved operational results. The dashboard accomplishes this by accepting and dynamically incorporating advanced system inputs from the managing entity. These advanced inputs, provided via the dashboard, allow for the simple customization and improvement of policy-driven systems. The advanced inputs may be, for example, the desired results of policy enforcement, the importance weightings of various policy enforcement factors or even system performance thresholds. This is uniquely different than explicitly setting profiles via a dashboard. The dashboard and associated components may use these inputs to design profile sets such that policies are capable of most effectively producing the desired customized results and operational behaviors. For clarity—as per the above connection manager example—if an advanced input is received via the dashboard to offload only the top 20% of bandwidth consumers, only those devices will have the associated advanced profile required to enforce this particular offload policy. With respect to this trait, user profiles have not been explicitly set by service providers. This is a dynamically changing set of users only identified through an analytic and comparative process. A human interactive dashboard is but one example of an interface that may be provided to the embodiment. Other examples of dashboards would be various forms of interfaces, some of which may communicate with services as opposed to human users.

It is envisaged that the profiling clients—in accordance with the embodiments of the invention—may be associated or bundled with offload controllers or connection managers in wireless networks.

Aspects of the invention are only discussed by way of example relative to data offload solutions; however the concepts may be more broadly applied.

The invention may be used to modify offloading policies in order to improve the efficiency with which offloading solutions meet the desired performance results of wireless service providers. The existing structure of prioritization policies can be leveraged to perform new high value processes in the realms of load balancing and data offload. Although currently being used to prioritize specific networks they can, with modification, be used to prioritize the selection of the best access points within these networks. In this way, users are most likely to receive the highest quality of service (QoS) available from their set of connection options.

As an example, consider the following network prioritization policy:
1. User's self defined access points.
2. Home service provider's owned access points.
3. 1st preferred roaming partner
4. 2nd preferred roaming partner This may be modified and expanded into the following network/access point prioritization policy:
1. Level 1 access points from the user's set of defined access points.
N. Level N access points from the user's set of defined access points.
N+1. Home service provider's level 1 access points.
2N+1. Home service provider's level N access points.
2N+2. 1st preferred roaming partner's level 1 access points.
3N+2. 1st preferred roaming partner's level N access points.

Where Level 1 represents the highest-grade access points for quality of service and N represents the Nth highest grade. In the previous example, network selection preferences, which are often set by complex business agreements by wireless service providers, are never violated and yet the resulting QoS for users is improved. However, in some cases it may be appropriate to modify the order of selected networks to further improve the resulting QoS for users.

The embodiment processes data from any subset of wireless devices, access points, network management systems, third party data sources, and crowd sourcing applications to modify network prioritization policies to include the prioritization of access points within networks. This will result in improved QoS for wireless device users and overall improved results obtained through data offload solutions. These modified lists are compatible with all methods of data offload and load balancing including, but not limited to: ANDSF, HotSpot2.0, GAS, ANQP, IEEE 802.11u, IEEE 802.11v, or Wi-Fi Certified Passport™, pre-loaded connection managers and systems without a direct connection manager and policy server communication. In the case of systems with direct connection manager and policy communication, lower priority access points would be made unavailable to wireless devices to force them onto the highest priority access points.

IEEE 802.11 will need to support data offloading processes by providing devices—before they connect—with a sense of what quality of service they would receive by connecting to a particular access point or network. This may take the form of a broadcasted message or a QoS estimate response to a wireless device wireless environment scan. This embodiment will refer to both these scenarios as broadcasts.

Broadcasts, which indicate connection QoS, may take the form of: direct measures (throughput, latency, jitter, packet loss, etc.); an encoding or class for these direct measures; or a new class value that combines several QoS metrics (throughput, latency, jitter, packet loss etc.) into one class value that indicates an aggregate notion of QoS.

Hence, analytic processes will be required to determine how to best combine several measures into one class value that is representative of QoS. Further, analytic processes will be required to determine a system for mapping how downlink IP traffic classes can be best translated into over-the-air 802.11 traffic estimations. This mapping is likely to be service provider specific and may need to be transferred to the device for use. This mapping will allow devices to interpret the broadcasts and estimate what their likely IP traffic quality would be after a connection is established.

Offload controllers and connection managers use methods to generate, deploy and selectively enforce offloading policy. The embodiment covers the dynamic generation of advanced profiles of the input entities. The advanced profiles, as they are dynamically created and updated, would then be made available to the policy generation, policy deployment, and connection enforcement methods so as to autonomously improve network performance. This profile generation process is most appropriately performed by a server, computing cluster, or cloud infrastructure that amalgamates all available information from devices, connection managers, offload controllers, access points, service provider databases, and external entities so as to dynamically generate useful and detailed profiles to be fed back for use in the policy methods.

Modification of device controller policy refers to policy manipulation, providing information to policy generating processes, managing policies, generating policies, or any such process or mechanism that affects policy. This embodiment intends to assess, guide, or otherwise inform the creation, modification, or restructuring of device polices.

In another aspect, the invention provides a method for regulating wireless device operations in wireless networks comprising a plurality of wireless devices whose operation is responsive to policies, a plurality of profiling clients on said devices whose operation is responsive profiles, one or more profiling servers in communication with said devices which generates profiles, and one or more policy managers in communication with said devices which contains a store of policies, the method comprising: the profiling servers accepting data from more than one data source; the profiling servers analyzing the accepted data to generate profiles; the profiling servers communicating profiles to devices and profiling clients; policy managers communicating policies to devices and profiling clients; profiling clients creating and/or modifying policies by as governed by the profiles; using said policies to govern wireless device operation; and communicating the performance of the profiles, policies, and device operation as data to the profiling servers, whereby the data communication processes are likewise governed by said profiles a method for modifying device controller policy in a network comprising a plurality of communicating devices whose operation is controlled by a device controller policy, the method comprising: accepting data from at least one data source; generating profiles by analyzing the accepted data; using the profiles to update the device controller policy by sending data to the communicating devices, and communicating the performance of the profiles, the device controller policy and/or the device.

In a further aspect the invention provides a profiling server for distributing profiles to profiling clients to govern the operation of devices and/or device controllers within a system containing multiple devices, comprising: an input for receiving a set of data from multiple data sources; one or more processors configured to aggregate and analyze the data to dynamically generate a set of profiles; and one or more profiling managers for distributing the set of profiles to remote profiling clients.

In yet an other aspect the invention provides a profiling client for updating polices which govern wireless devices operations on a wireless device operable within a system, comprising: an interface for receiving updated profiles from a profiling server which are generated dynamically from multiple sources, within and/or external to the system; and an application programming interface "API" for creating and/or modifying polices; and wherein the profiling client is configured to communicate performance of the profiles, polices, and/or wireless device to a profiling server.

BRIEF DESCRIPTION OF THE DRAWINGS

The invention will now be described in more detail, by way of example only, with reference to the accompanying drawings, in which:

FIG. 10 shows the wireless device's connection matrix for which access point to connect to.

FIG. 11 describes how to define QoS classes that reflect an aggregation of the measures that affect QoS, classify traffic as belonging to one such QoS class, and produce mappings that will allow devices to translate these broadcasted classes into connection quality estimations.

FIG. 12 describes how to define congestion classes that reflect an aggregation of the measures that affect congestion, classify traffic as belonging to one such congestion class, and produce mappings that will allow devices to translate these broadcasted classes into connection quality estimations.

FIG. 13 shows mapping congestion class values into connection QoS estimations.

DETAILED DESCRIPTION OF EMBODIMENTS OF THE INVENTION

Figure 1:
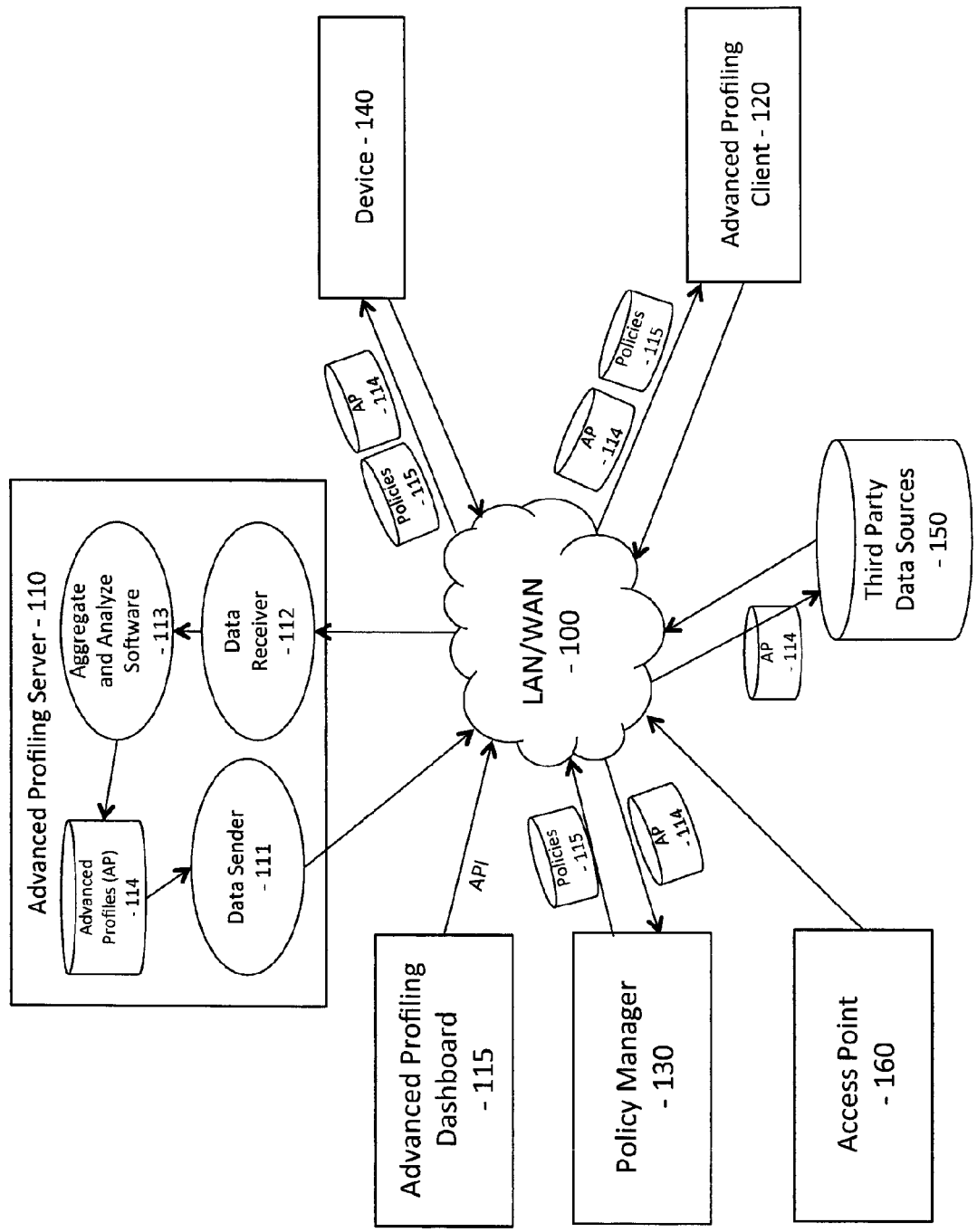
FIG. 1 is a high-level block diagram of one embodiment of a system for managing device controller policy.

FIG. 1 is a high-level block diagram of one embodiment of a system for managing device policies and depicts an advanced profiling server 110 connected to the LAN/WAN/RAN 100 (Local Area Network, Wide Area Network, Radio Access Network) and in communication with at least one advanced profiling client 120, that can reside on a device 140, an access point 160 or a policy manager 130, which can be a laptop, offload controller, device managing server, device controlling server, mobile phone, dongle, and additional forms of either mobile or stationary devices or machines. Wi-Fi access points 160 make up the WAN and cell towers make up the RAN. Third party data sources 150 are accessible and may be connected via the LAN/WAN 10 or the advanced profiling server 110 could directly connect to third party data sources 150. Here a third party data source 150 refers to any additional source of information that may aid in the building and generation of more detailed profiles for the purpose of enhancing the performance of the device 140. The advanced profiling server 110 has a data receiver 112 to receive data from the advanced profiling client 120, the device 140, third party data sources 150, policy manager 130 and/or advanced profiling dashboard 115. The advanced profiling server 110 also contains aggregate and analyze software 113 to aggregate and analyze said data to generate advanced profiles 114 and a data sender 111 to distribute the advanced profiles 114 to an advanced profiling client 120, device 140, dashboard 115, access point 160, or policy manager 130.

The policy manager 130 is a current state-of-the-art system that manages policies 115 and pushes them to the device 140 or the advanced profiling client 120. The device 140, advanced profiling client 120, or policy manager 130 uses the advanced profiles 114 to modify the policies 115. The policies 115 include data offloading policies.

The device 140 communicates data back to the advanced profiling server 110 by way of appropriate communication interfaces established between at least one of: the advanced profiling client 120; direct to the advanced profiling server 110; or through third party data sources 150. Furthermore, the advanced profiling server 110 may also transmit the advanced profiles 114 back to the third party data sources 150.

The advanced profiling dashboard 115 is the user interface of the advanced profiling server 110 and advanced profiling client 120. Users can provide further inputs, such as setting additional policies, setting profile thresholds, and setting profile weightings to fine tune the advanced policy server 110 to fulfill the needs and/or demands of the device 140 or service provider. Furthermore, the advanced profiling dashboard 115 provides a means of extracting human-readable profiles and analytics from the advanced profiling server 110. In the preferred embodiment, the advanced profiling dashboard 115 communicates through an Application Programming Interface (API) so that it can interface with services as well as human users.

Figure 2:
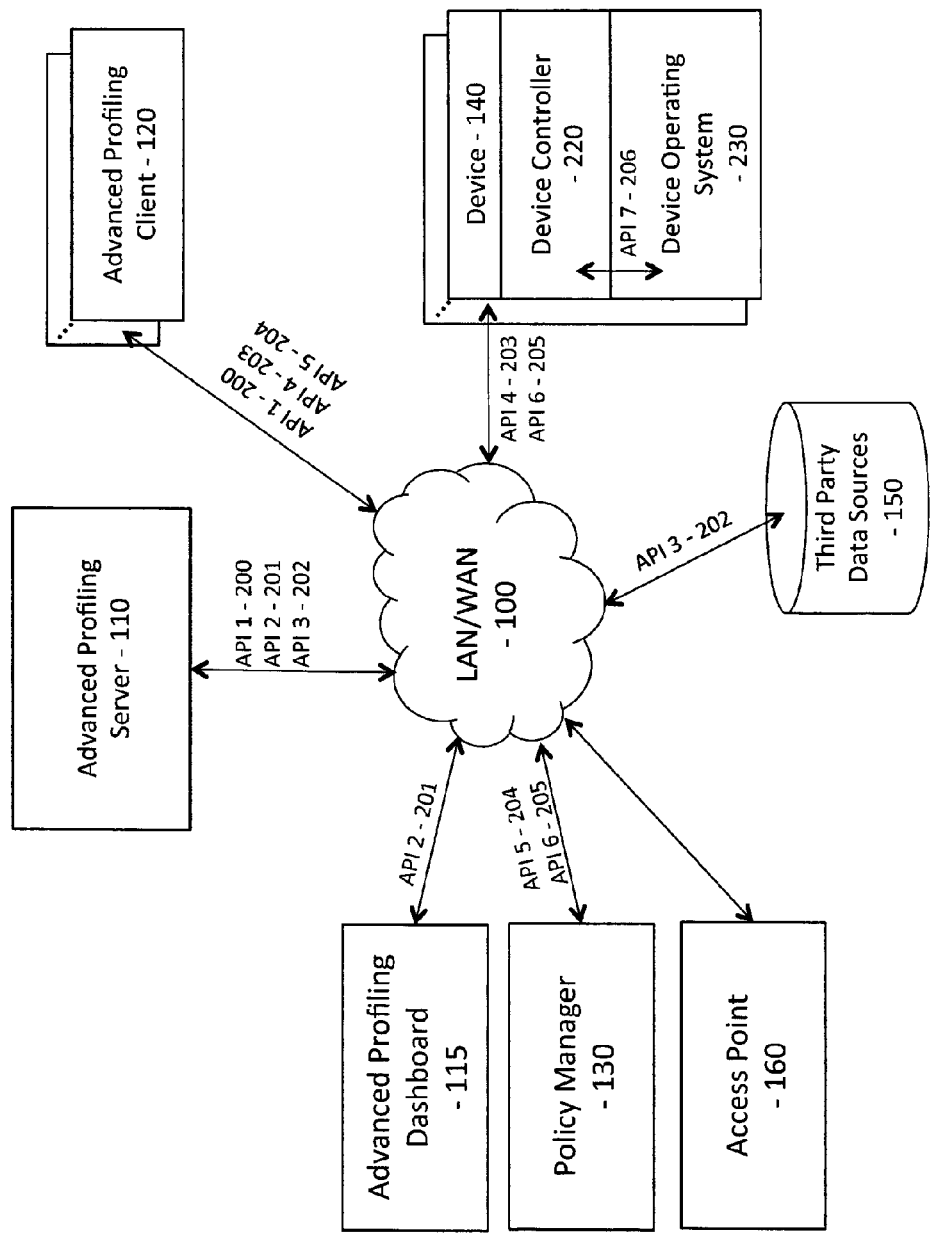
FIG. 2 illustrates the various communication paths through APIs in the system.

FIG. 2 depicts one embodiment for informing or modifying policies 115. In a complete system the advanced profiling server 110 is in communication with third party data sources 150, a plurality of advanced profiling clients 120 implemented alongside or within a plurality of devices 140, advanced profiling dashboards 115, policy manager servers 130, and access points 160. As technology progresses, some of these components could be positioned as a cloud based implementation.

The advanced profiling server 110 is the component primarily responsible for building advanced profiles 114 of device and network characteristics by amalgamating and analyzing data from, for example, a plurality of advanced profiling clients 120, advanced profiling dashboards 115, devices 140, policy manager servers 130, and third party data sources 150. These components capture data related to—but not limited to—users, location, devices, applications, operational behavior, access points, and network data.

This data is consumed by the advanced profiling server 110 to build profiles of—for example—users, locations, devices, applications, and access points/networks, as well as the interconnection relationship profiles. The advanced profiling server 110 is used as a data collection and analysis point. It receives reported data and uses the resulting analytics to improve the information available in the form of advanced profiles 114. In the absence of an advanced profiling client 120, the information will be directly distributed to policy manager servers 130 and/or devices 140. Alternatively, the said advanced profiles 114 may be provided to wireless service providers, original equipment manufacturers, or any other third party entity (as permitted by jurisdictional laws) to improve systems, processes, or business intelligence in any way.

These profiles 114 may consist of—but are not limited to—aggregate, summarized, statistically analyzed, or otherwise processed data, as well as detailed descriptions. Further, the profiles 114 are dynamically evolving and describe some of the most important variables used in the policy enforcement logic of devices 140.

In the preferred embodiment, the advanced profiling server 110 communicates through respective application programming interfaces (API 1 200, API 2 201, API 3 202) to the advanced profiling clients 120, advanced profiling dashboards 115, and the third party data sources 150.

The advanced profiling client 120, in the preferred embodiment, is the component primarily responsible for collecting the necessary data from the device 140, policy manager 130, and access points 160. Advanced profiling clients 120 may further be used to inform, create and/or modify policy, and are primarily driven by the utilization of profiles 114 that are partially generated from the data that they report to the advanced profiling server 110. In the preferred embodiment, a plurality of advanced profiling clients 120 are implemented alongside a multiplicity of devices 140 and/or policy managers 130. These advanced profiling clients 120 communicate, through different respective APIs (API 1 200, API 4 204, API 5 205), with the advanced profiling server 110, a plurality of devices 140, and/or policy manager servers 130.

The device 140 has a component—the device controller 220—which is primarily responsible for consuming advanced profiles 114 (from the advanced profiling client 120 or the advanced profiling server 110) and policies 115 (from the policy manager 130 or the advanced profiling client 120) to enforce desired functionality of the device operating system 230. In some implementations, the policies consumed by the device controller 220 have been modified by the advanced profiling client 120. Mechanisms and methods within the device controller 220 supply the necessary functionality to deliver control over the operation of a device 140. The device operating system 230 is a software package that manages the device hardware resources and provides the services necessary to execute application software on the device. The device controller 220 communicates through respective APIs (API 4 203, API 6 205, API 7, 206) to the advanced profiling client 120, the policy manager 130, and the device operating system 230 in order to execute commands as enforced by policy.

The policy manager 130, in the preferred embodiment, is the component primarily responsible for storing, distributing, and managing device policies 115. A policy is a set of rules or a course/principle of action to guide or govern decisions, functionality, or operation of a device. The policy manager 120 may collaborate with advanced profiles 114 from the advanced profiling server 110, the advanced profiling client 120, and third party data sources 150, to appropriately generate and deliver policies to devices 140.

Figure 3:
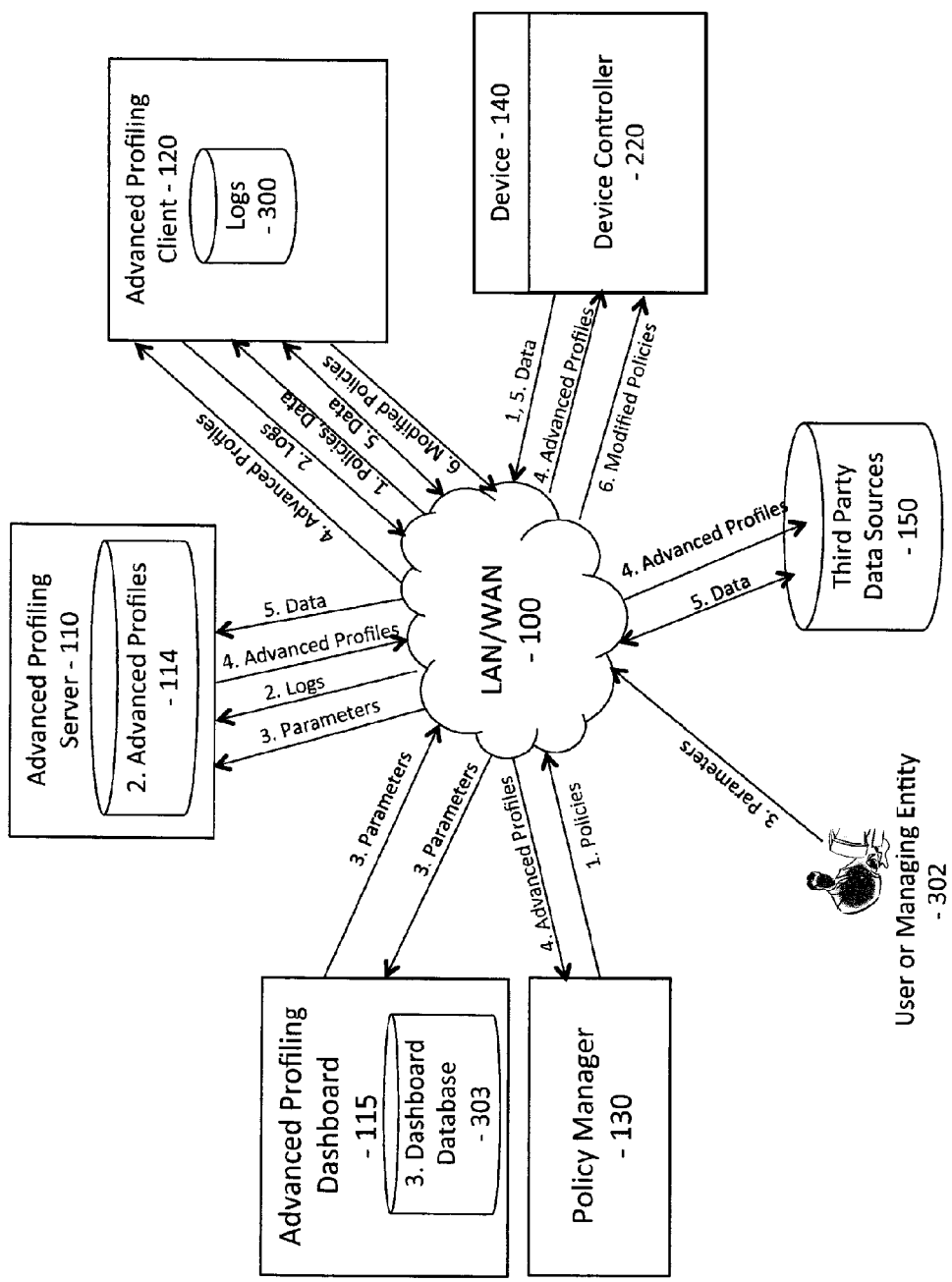
FIG. 3 shows the data paths through the system.

FIG. 3 shows the system operating in five distinct, interrelated steps:

1. Advanced profiling clients 120 collect appropriate data from devices 140 and policies 115 (from policy managers 130) to be stored in logs 300. The said logs 300 contain data related to—but not limited to—users, location, devices, applications, operational behavior, access points, and network data.

2. The data logs are transferred to the advanced profiling server 110 and combined with a composite set of information across devices 140, policy managers 130, managing interfaces, networks, wireless service provider databases, and third party data sources 150. A set of advanced profiles 114 and the interconnecting relationship profiles are then built by proprietary analytics and/or statistical process from the said composite set of information.

3. Users, or some form of system managing entity 302, may interact with the advanced profiling dashboard 115 to set various parameters in the dashboard database 303 that further refine advanced profiles 114. This process provides the users or managing entities 302 with an opportunity to include contextual information to the advanced profiles 114 that ultimately provides increased functionality during the policy enforcement process.

4. Advanced profiles 114 are sent to advanced profiling client 120, if available, in order to appropriately inform or modify policy. Alternatively, advanced profiles 114 may be directly distributed to device controllers 220, policy managers 130, or third party data sources 150. Device controllers 220 and policy managers 130 then may incorporate any received profile and/or policy information of relevance to govern the policy generation, distribution, and enforcement processes on the device 140.

5. The device 140 may communicate data back to the advanced profiling server 110 by way of appropriate communication interfaces established between at least one of the following: via the advanced profiling client 120; direct to the advanced profiling server 110; or through third party data sources 150.

6. Modified policies and advanced profiles are sent from the advanced profiling client 120 to the device controller 220.

The embodiment described can denote the development of the processes, algorithms, and mechanisms required to develop advanced offloading profiles to support improved offload decision processes where these advanced offloading profiles comprises the extension of the state-of-the-art in offloading to comprise 1-5 above. In this case, the device 140 is a wireless communication device—such as a mobile smartphone, laptop or dongle. The device controller 220 functions as the connection manager to enforce data offload. An offload controller in the wireless service provider's network provides the role of the policy manager 130. Advanced profiles 114, supplied by the advanced profiling server 110, may be used to modify connection priorities and the behavior of connection managers (device controller 220) in order to improve all subsequent connection decisions. Alternatively, these advanced profiles 114 may simply provide a source of additional information to connection managers (device controller 220) and offload controllers (policy manager 130) that may be referenced when appropriate. In this embodiment, the loop between the advanced profiling server 110, the advanced profiling client 120, the advanced profiling dashboard 210, the offload controller (policy manager 130), the connection manger (device controller 220), and the device operating system 230 ensure that connection decisions are continuously improving. The connection manager (device controller 220) consumes policy information from an offload controller (policy manager 130) and, when appropriate, will cooperate with an advanced profiling client 120 to implement a seamless transition of data flow onto an alternative wireless communication network dependent on the advanced profiles 114 generated by the advanced profiling server 110. Depending on the supported wireless communication device hardware, networks available for offload may include, but are not limited to, various grades of cellular wireless communication networks, WiMAX, WLAN, femtocell and picocell access networks. It is important that all offloaded data flows maintain or improve user quality of service and provide an uninterrupted experience while accomplishing service provider user management goals. The connection manager (device controller 220) will make all connection decisions through a collaborative process among the device 140, advanced profiling client 120, the advanced profiling server 110, and the offload controller (policy manager 130).

Figure 4:
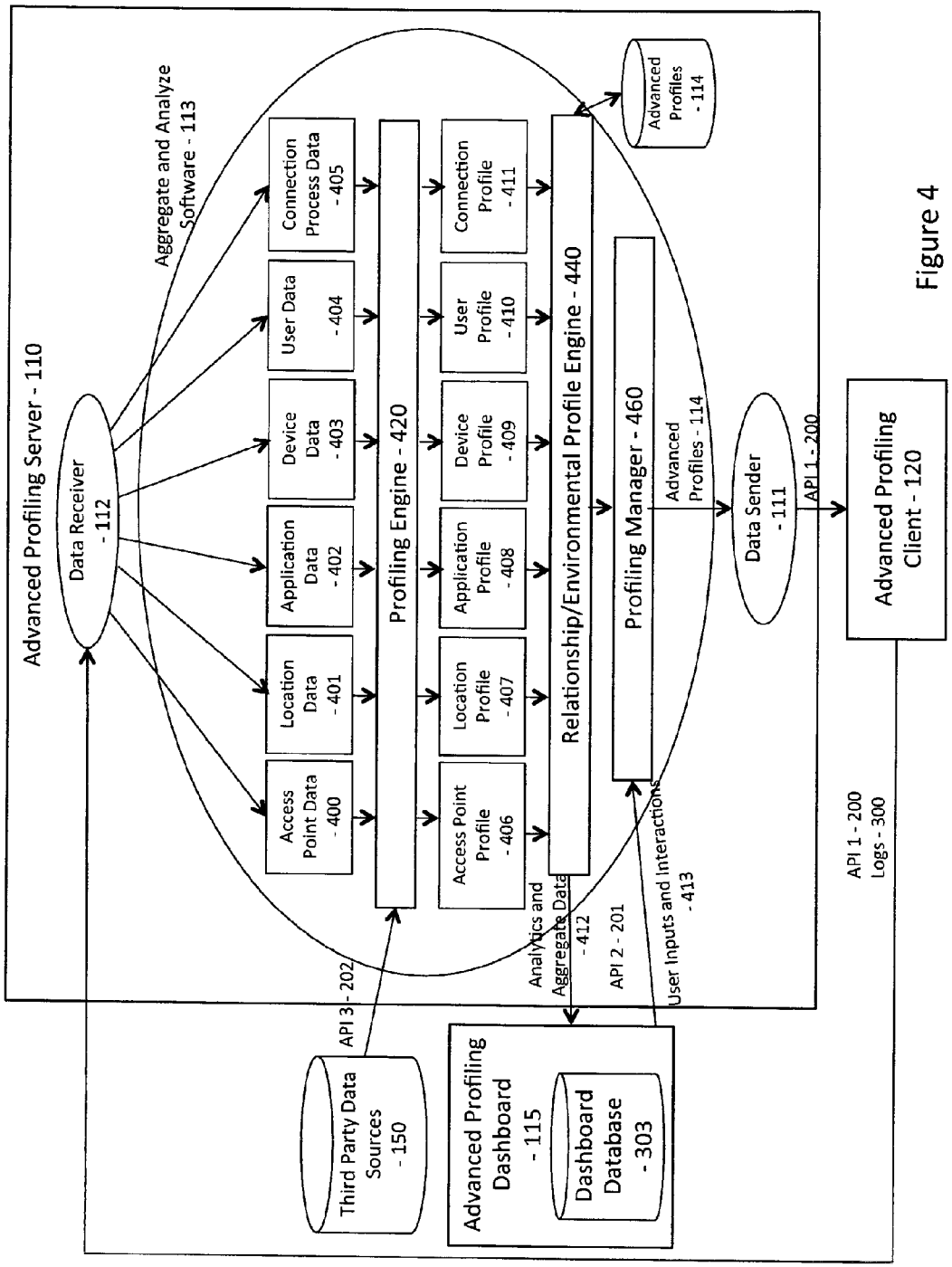
FIG. 4 illustrates an embodiment of the inner components of the advanced profiling server and the advanced profiling dashboard.

FIG. 4 depicts one embodiment of the inner components of the advanced profiling server 110, and in particular the Aggregate and Analyze Software 113. This includes: an example set of data 400, 401, 402, 403, 404, 405; a profiling engine 420; advanced profiles 406, 407, 408, 409, 410, 411; a relationship/environmental profile engine 440; and a profiling manager 460. One example application and embodiment of an advanced profiling server 110 is the implementation of a mobile connection manger system to enforce data offload policies.

Raw data collected and stored in data logs 300 by the advanced policy client 120 is received in the data receiver 112 of the advanced profiling server 110 through the logs API 1 200. The data logs 300 contain data related to, but not limited to users 404, location 401, devices 403, applications 402, connection process 405, and access points 400. In this embodiment, the raw data 400, 401, 402, 403, 404, 405 is processed by the profiling engine 420 into a plurality of advanced profiles 406, 407, 408, 409, 410, 411. The profiling engine 420 builds a collection of summarized, aggregate, analytic and statistical processed data as well as detailed descriptions to produce the advanced profiles 406, 407, 408, 409, 410, 411.

These advanced profiles 406, 407, 408, 409, 410, 411 include, for example, users 410, locations 407, devices 409, applications 408, connections 411, and access points 406. Mechanisms used by the profile engine 420 to construct the advanced profiles 406, 407, 408, 409, 410, 411 may include, but is not limited to, data mining algorithms and methods.

Additional inputs from third party data sources 150 into the profiling engine 420 may add additional measures to provide further information in developing the advanced profiles 406, 407, 408, 409, 410, 411. A third party data source 150 refers to any additional source of information that may aid in the building and generation of more detailed profiles for the purpose of enhancing the performance of device controllers 220. These additional third part data sources 150 may include, but are not limited to, access network measures, policy manager 130 policies, network topologies, OEM policies, system topologies, or other third party sources. The third party data sources 150 are communicated to the profiling engine 420 through the third party input API 3 202.

The advanced profiles 406, 407, 408, 409, 410, 411 are supplied to the relationship and environmental profile engine 440. The relationship and environmental profile engine 440 contains, in this embodiment, mechanisms to establish a connection and correlation between the advanced profiles 406, 407, 408, 409, 410, 411. Mechanisms used may comprise of, but are not limited to, data mining algorithms or methods to assemble these interconnections amongst the advanced profiles 406, 407, 408, 409, 410, 411. The relationship, environmental correlations produced by the relationship, and environmental profile engine 440 are stored—along with the advanced profiles 406, 407, 408, 409, 410, 411—in the profiles database 114. An example of a relationship profile may be: devices tend to exhibit behavior A when interacting with system B but only when near locations similar to C. This relationship profile is formulated from the correlation of three separate independent profiles.

In addition, the relationship and environmental profile engine 440 provides analytics and aggregate data 412 to the Advanced Profiling Dashboard 115 through the dashboard API 2 201. The advanced profiling dashboard 115 is the user interface for the system and may alternatively be implemented via a cloud based structure or any other form of user interface. The advanced profiling dashboard 115 includes a dashboard user interface (see FIGS. 8 through 13) and a dashboard database 303. The advanced profiling dashboard 115 receives advanced profiles 406, 407, 408, 409, 410, 411 from the relationship and environmental profile engine 440 through the dashboard API 2 201 to the advanced profiling server 110. The dashboard user interface communicates the analytics to users and, in turn, user inputs and interactions 413 are communicated to the profiling manager 460 through the dashboard API 2 201. User inputs can include, but are not limited to, performance thresholds and profile weightings to fine tune the needs and/or demands of the device wireless service providers. The advanced profiling dashboard 115 is unique in that users may set thresholds, weightings, and desired policy enforcement results. The said inputs are then used by the profiling manager 460 to create customized policies that are selectively distributed to device controllers 220 based on the comparative profiles to most effectively meet performance objectives. The dashboard database 303 stores user preferences and the like that are received from the user inputs.

In the preferred embodiment, the profiling manager 460 extracts user inputs and interactions 413 from advanced profiling dashboard 115 and integrates these inputs with the output from the relationship and environmental profile engine 440 and the profiles database 114. The profiling manager 460 then uses this composite set of information and instructions to direct and manage the distribution of the advanced profiles 406, 407, 408, 409, 410, 411 using the data sender 111 to advanced profiling clients 120 through the profiles API 1 200. In the absence of an advanced profiling client 120, this information may alternatively be directly distributed to device controllers 220, device operating systems 230, and policy managers 130, as well as third party data sources 150.

Figure 5:
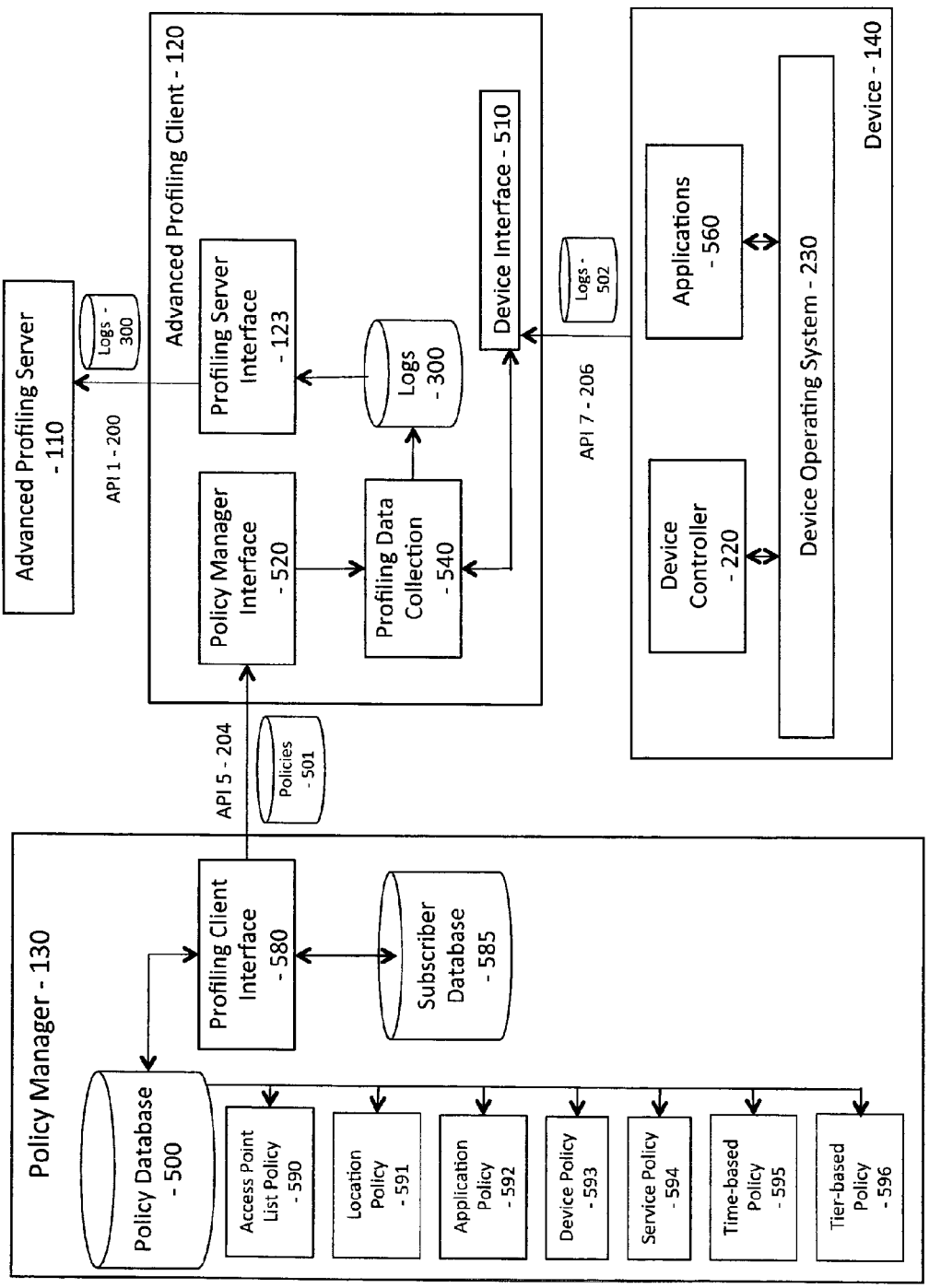
FIG. 5 illustrates an embodiment of the inner components of an advanced profiling client and the interface to a policy manager, device, device controller, and device operating system, and how logs are generated and sent to the advanced profiling server.

FIG. 5 depicts one embodiment of the inner components of an advanced profiling client 120, policy manager 130, and a device 140 necessary for creating logs 300. The advanced profiling client 120 is the component primarily responsible for collecting the necessary data from the device 140 and policy manager 130. The advanced profiling client 120 includes a profiling server interface 123 using API 1 200 to pass the logs 300 to the advanced profiling server 110, a policy manager interface 520 which uses API 5 204 to retrieve policies 501 from the policy manager 130, and profiling data collection 540 which takes policies 501 from the policy manager 130 and device control and functionality logs 502 from device 140 and creates logs 300 which are passed to the advanced profiling server 110.

The profiling data collection 540 component is the component primarily responsible for collecting and gathering the necessary information to produce advanced and appropriate control of the functionality of the device 140 and the device operating system 230. The profiling data collection 540 component collects policies 501 from, but not limited to, the policy manager 130. The policy manager interface 520 receives policies 501 from the policy manager 130 and provides them to profiling data collection 540. Policies 501 collected by the profiling data collection 540 component are stored in data logs 300 before being transmitted to the advanced profiling server 110. The profiling data collection 540 component may itself actively seek and acquire information, and/or various components may actively provide it with information. Policies 501 collected by the profiling data collection 540 component and stored in the data logs 300 include, although are not limited to: network access points 590, location 591, device information 593, application information 592, time stamp 595, service 594, and tiers 596.

The device controller 220 may provide a means by which device control and functionality logs 502 can be supplied to the profiling data collection 540 component. The device software applications 560 may provide a means by which application performance, control, and functionality logs 502 can be supplied to the profiling data collection 540 component. The profiling data collection 540 component interacts with the device operating system 230 to collect logs 502 regarding the activities of the device 140, the local conditions, and the like. Data collected by the profiling data collection 540 component and stored in the data logs 300 includes, although is not limited to: device operation; application operation; user behavior and control policies; and observed network and connection errors. The logs 300 are communicated to the advanced profiling server 110 through the logs API 1 200 to assist in the generation of advanced profiles 114.

The policy manager 130 is the component primarily responsible for storing, generating, distributing and managing device policies. The policy manager 130, in the preferred embodiment, includes a profiling client interface 580, a subscriber database 585, a policy database 500, and a plurality of policies (590, 591, 592, 593, 594, 595, 596). The profiling client interface 580 is the link between the policy manager 130 and the policy manager interface 520 through the policy manager API 5 204. The subscriber database 585 contains the data related to user, device, or the like. The policy database 500 contains the data related to policies providing the rules for operating the device 140 in a particular manner. The policies 500 include, but are not limited to, access point lists 590, locations 591, applications 592, subscribers 585, time 595, tiers 596, service levels 594, devices 593, and the like. Policy managers 130 are potentially covered under prior art.

Figure 6:
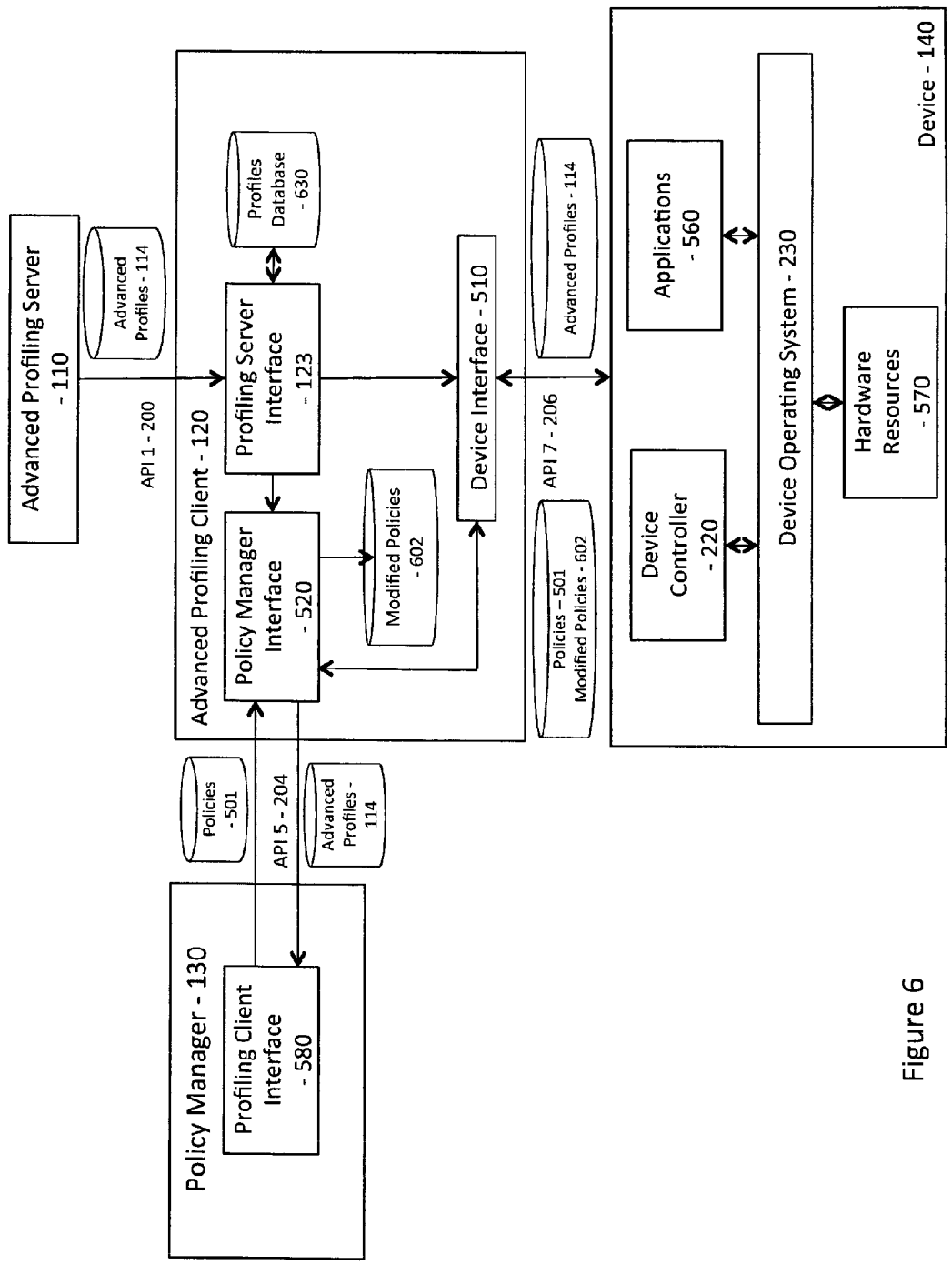
FIG. 6 illustrates an embodiment of the inner components of an advanced profiling client and the interface to a policy manager, device, device controller, and device operating system, and how profiles and policies are used.

FIG. 6 depicts one embodiment of the inner components of an advanced profiling client 120, policy manager 130, and a device 140. The advanced profiling client 120 is the component primarily responsible for collecting the necessary data from the device 140, policy manager 130, and device controller 220. The advanced profiling client 120 includes a profiling server interface 123, a policy manager interface 520, a device interface 510, modified policies 602, and a profiles database 630. The advanced profiling client 120 is the primary interface between the advanced profiling server 110 and the policy manager 130, device controller 220, and device operating system 230. Advanced profiling clients 120 may further inform and/or modify policy and are primarily driven by the appropriate utilization of advanced profiles 114 that are partially generated from the logs 300 that are reported to the advanced profiling server 110.

Advanced profiles 114 are transmitted from the profiling manager 460 within the advanced profiling server 110 to the profiling server interface 123 through the API 1 200. Advanced profiles 114 relevant to that specific device are stored in the profiles database 630. Advanced profiles 114 stored in the profile database 630 may be called depending on the localized conditions of the device 140 and the functionality of the device operating system 230.

The profiling server interface 123 communicates and distributes advanced profiles 114 to—but not limited to—the device controller 220, policy manager 130, and device software applications 560. The advanced profiles 114 issued to the device controller 220 from the profiling server interface 123 control the functionality of the device 140 and the device operating system 230. Similarly, the advanced profiles 114 issued to the device software applications 560 from the profiling server interface 123 control the functionality of the device software applications 560. The profiling server interface 123 distributes advanced profiles 114 through a policy manager interface 520, to the profiling client interface 580 to assess, guide, or otherwise inform the creation, modification, or restructuring of policies 501, and then to the policy manager 130. The policy manager interface 520 communicates to the policy manager 130 through the policy manager API 5 204.

The policy manager interface 520 receives policies 501 from the policy manager 130, then either leaves policies in their original state or modifies them using information found in the advanced profiles 114. The set of original policies 501, the set of modified policies 602, or some combination thereof is then passed to the Device 140 directly through the device interface 510, or indirectly through the Policy Manager 130. Modified policies 602 are modified for the purpose of improving Device Controller 220 and Device 140 performance.

The device controller 220 is the component primarily responsible for consuming advanced profiles 114 from the advanced profiling client 120, modified policies 602, and policies 501 from the policy manager 130 to enforce desired functionality of the device operating system 230. Mechanisms and methods within the device controller 220 supply the necessary functionality to deliver control over the operation of a device 140. Device controllers 220 themselves are potentially covered under prior art however our embodiment is a separate entity.

This embodiment of a device 140 includes a device controller 220, and the device operating system 230. Examples of devices 140 may include, but not limited to, laptops, mobile phones, dongles, and additional forms of either mobile or stationary devices or machines and the like which may or may not have wireless connections. The device 140 is the system in which a particular set of functions or operations are to be controlled using a set of rules, comprised of, although not limited to, policies, profiles, and user inputs. Externally supplied policies may be in the form of a command message, which in this case is a policy that is not conditionally enforced. Alternatively, the device 140 may simply send command messages to various interconnected systems. The types, the number, the applications, the functionality, the operation, or the hardware resources of the device 140 do not limit the scope of this embodiment. The device 140 may comprise of, but is not limited to, a device operating system 230, hardware resources 570, and software applications 560. The device operating system 230 is a software package that manages the device hardware resources and provides the services necessary to execute application software on the device. Devices 140 and the device operating systems 230 are known to persons skilled in the art.

In summary, the device controller 220 is the only piece that enforces policies to perform device actions. The advanced profiling server 110 is the only piece that generates advanced profiles 114. Advanced profiles 114 are generally passed to the advanced profiling client 120. The advanced profiling client 120 can exist attached to the policy manager 130, the device 140 (wireless device, access point, or other), or the advanced profiling server 110, or can be stand alone. The advanced profiling client 120 can use the advanced profiles 114 to modify policies 501 directly, or it can pass advanced profiles 114 to the policy manager 130 or device 140 components and allow them to modify the policies 501. For the advanced profiling client 120 to modify policies 501, the policy manager 130 or policy store on the device 140 would need to pass policies 501 to the advanced profiling client 120. The modified policies 502 would then be passed to the device controller 220 for use. If the advanced profiling client 120 is not modifying policies 501 directly, and is instead supplying advanced profiles 114 to the policy manager 130 or device 140, then it will be their responsibility to pass any modified policies 502 to the device controller 220.

One example application and embodiment of a device component 140 is the implementation of a mobile connection manger system to enforce data offload policies. The advanced profiling client 120 may be used to either provide additional information to assess, guide, or otherwise inform the creation, modification, or restructuring of device offload polices and/or the connection logic algorithm used by the connection manager (device controller 220) to offload mobile data to alternative access networks.

Additionally, the advanced profiling client 120 is used to report data logs 300 to the advanced profiling server 110. The advanced profiling client 120 in return receives the set of advanced profiles 114 that are used as the discussed inputs into the connection logic method. In the connection manager system application, a loop between the advanced profiling client 120 on the device 140 and the advanced profiling server 110 will provide for the ongoing improvement of policies and user experience. Data collected by the profiling data collection 540 component and reported to the advanced profiling server 110 through data logs 300 includes, although is not limited to, the following: the observed access point basic service set identification (BSSID); the service set identifier (SSID) of the network connected to the access point; the received signal strength indication (RSSI) of the access point; the network throughput; the network latency; the access point authentication; the access point key management; the access point encryption schemes; the frequency of the channel over which the client is communicating with the access point; location; device information; application information; application data flow to the various access point; user data patterns; time stamps; and the like.

The mobile connection manager system application, in the preferred embodiment, utilizes a connection manager as the device controller 220. The connection manger (device controller 220) is a software package that may be held on the device 140 that is used to enforce access point connections and provide authentication credentials when applicable. The majority of these systems are static and do not communicate with a network server.

The embodiment demonstrates an advanced implementation of the connection manager system. In this embodiment, the connection manger (device controller 220) may receive its list of prioritized access points for offloading data from the offload controller (policy manager 120), and/or, alternatively, the advanced profiling client 120. The mechanisms for scanning, connecting, and authenticating to alternative access points may be performed by the connection manger (device controller 220) on the device 140. Scanning may alternatively be performed by the advanced profiling client 120 to retrieve available local device data.

The offload controller (policy manager 120) is a server software package that often ties into the service provider's subscription database to provide the advanced profiling client 120 or connection manager (device controller 220) with a prioritized list of access points via a transmission protocol. This prioritized list of access points is initiated by the wireless service provider to suit their cellular network and business requirements. The offload controller (policy manager 120) provides wireless service providers with the offload policy control they require to manage the explosion in data growth. In the mobile connection manager system application of the preferred embodiment, the advanced profiling client 120 may have a variety of implementations depending on the degree of integration with the connection manger (device controller 220) on the device 140. Six possible implementations are disclosed, although this does not present an exhaustive list of possible implementations of the advanced profiling client 120.

The first is a full integration of the profiling client 120 and the device controller 220, and is a collaborative data collection. In this implementation, the advanced profiling client 120 uses a method, informed by the advanced profiling server 110 and the offload controller (policy manager 130), to enforce improved connection decisions by modifying the information received by the connection manger (device controller 220). Further, the advanced profiling client 120 is capable of recording and reporting all data retrieved by the connection manger (device controller 220) via user inputs, scans, message transmissions, and the like.

In a non-collaborative data collection implementation, the advanced profiling client 120 uses a method, informed by the advanced profiling server 110 and the offload controller (policy manager 130), to enforce improved connection decisions by modifying the information received by the connection manger (device controller 220). However, the advanced profiling client 120 is not capable of recording and reporting data retrieved by the connection manger (device controller 220), and thus the advanced profiling client 120 must itself retrieve all reported data via user inputs, scans, recorded message transmissions, and the like.

The third is a semi-integrated collaborative data collection implementation. The advanced profiling client 120 is semi-integrated with a connection manger (device controller 220). The advanced profiling client 120 simply provides the connection manger (device controller 220) with an improved set of information that the connection manger (device controller 220) may then choose to use in its management processes. Further, the advanced profiling client 120 is capable of recording and reporting all data retrieved by the connection manger (device controller 220) via user inputs, scans, message transmissions, and the like. The advanced profiling client 120 acts as a simple API (API 1 200) to the advanced profiling server 110 to allow the connection manger (device controller 220) to communicate in order to send and/or receive information, data, profiles, and the like.

In a semi-integrated non-collaborative data collection implementation, the advanced profiling client 120 simply provides the connection manger (device controller 220) with an improved set of information that the connection manger (device controller 220) may then use in its management processes. However, the advanced profiling client 120 is not capable of recording and reporting data retrieved by the connection manger (device controller 220), and thus the advanced profiling client 120 must retrieve all reported data via user inputs, scans, recorded message transmissions, and the like.

In a fifth implementation, there is no integration with the device controller 220 and there is an advanced profiling client present. The advanced profiling client 120 simply acts as a data reporting tool to the advanced profiling server 110. Information is not fed back to the advanced profiling client 120 to provide improved data for the connection manger (device controller 220).

In the sixth implementation, there is no integration and no advanced profiling client 120. The Advanced Profiling Server 110 is acting as a stand-alone system. Systems, such as a connection manger (device controller 220), may simply choose to send data to the advanced profiling server 110 based on some pre-arranged agreement.

Figure 7:
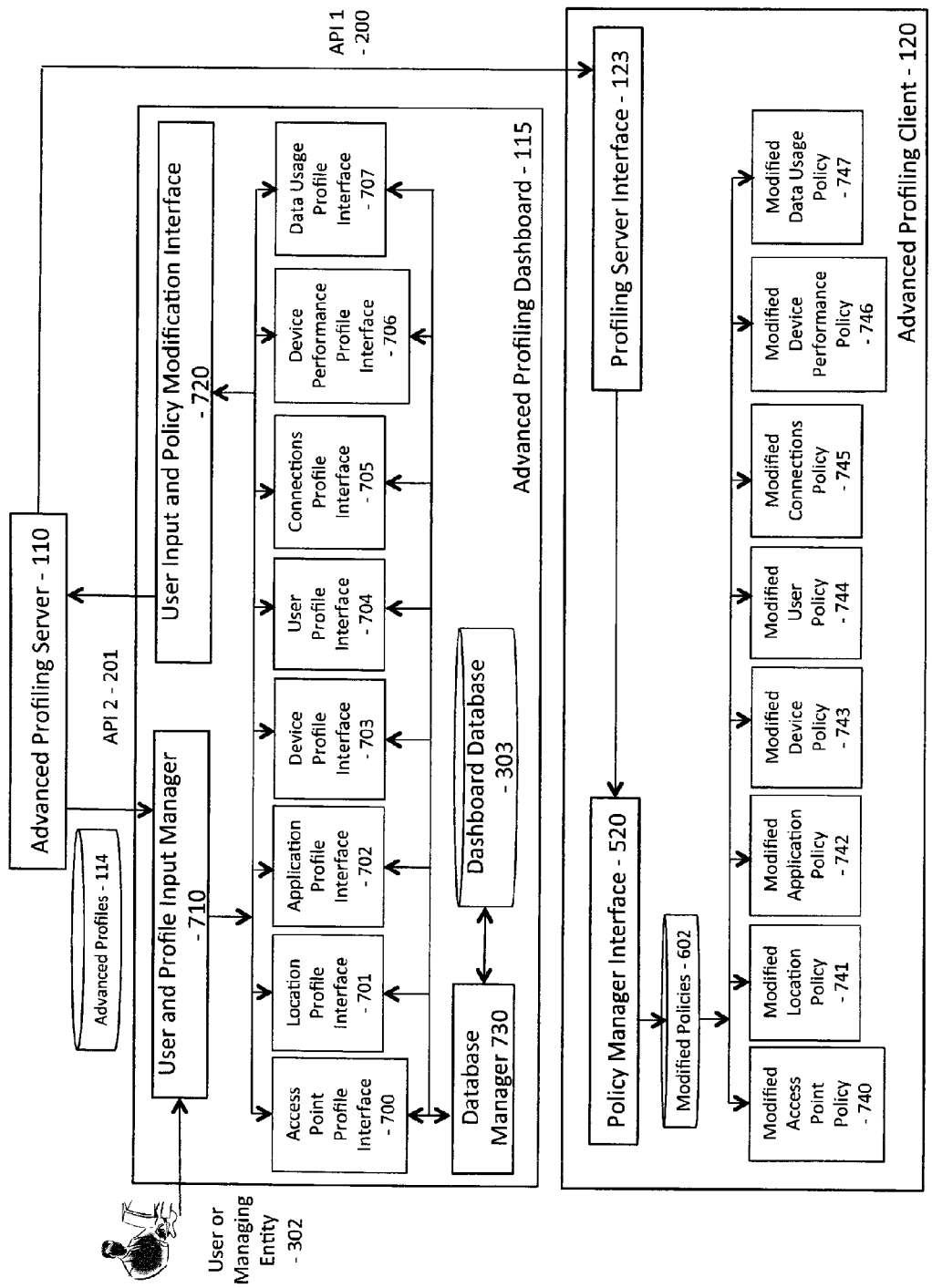
FIG. 7 illustrates one embodiment of the advanced profiling dashboard and dashboard user interface. The illustration shows how users can query the system to produce network, policy and offload solution assessments shown over the user interface. The illustration also shows how user input into dashboard may be passed to the advanced profiling client to either implement new policies or modify existing device policies.

FIG. 7 depicts the advanced profiling dashboard 115 in more detail. The user and profile input manager 710 accepts advanced profiles 114 from the advanced profiling server 110, and displays visualizations of these profiles 114, and the relationships between them, over the profile interfaces 700, 701, 702, 703, 704, 705, 706, 707. The advanced profiles 114, and any relationships generated by the profile interfaces 700, 701, 702, 703, 704, 705, 706, 707 are then stored in the dashboard database 303 using the database manager 730. The database manager 730 is designed to store this information in its most condensed form. It is also used to query the dashboard database 303 to construct any profiles or relationships requested by the user. The user and profile input manager 710 is also used to accept any user 302 inputs through the user interface. These user inputs may be information or assessment requests handled by the database manager 730.

Alternatively, these user inputs may provide new information such as new policies, access networks metrics, or desired system performance results. The user input and policy modification interface 720 processes any newly acquired information from the user 302 and performs the appropriate actions. If the user has inputted information that affects profile interfaces 700, 701, 702, 703, 704, 705, 706, 707 then the user input and policy modification interface 720 would interact with the advanced profiling server 110 to adjust these profiles. If the user has inputted new polices, new policy modifications, or new desired system performance results, the user input and policy modification interface 720 would communicate through the advanced profiling server 110 with the advanced profiling client 120 and profiling server interface 123 to instruct on how to modify or update polices to meet the system user's needs.

Examples will be given from the perspective of offloading solutions. This type of network analytics is different than other forms because offload solution network analytics place an emphasis on providing useful information to offloading solutions and the users of offloading solutions. Further, the data used for this specific type of network analysis would typically come from the offloading solution itself. This may be device-view data supplied by connection managers (device controllers 220) or advanced profiling clients 120. It may also leverage information supplied by policy managers 130 which may be working in conjunction with offload solution protocols such as those in ANDSF, HotSpot 2.0, GAS, ANQP, IEEE 802.11u, IEEE 802.11v, other IEEE 802.11 standards, pre-loaded connection managers, or systems without a direct connection manager to policy server communication.

As an example, consider a connection manager (device controller 220) or advanced profiling client 120 which measures user experienced quality of service on a particular network. This information may be combined with any network-viewed quality of service measures captured by the policy manager 130, working with a data offload solution, or measures received from third party data sources 150. The advanced profiling server 110 would then generate access point profiles 406 to be displayed over the access point profile interface 700. The system user 302 can then assess the quality of the access point 160 from the perspective of the offloading solution. Displayed information may include how the user experiences the access point when offloaded to it, how the user's presence on that access point affects overall network performance and capacity, or how the access point should best be used, upgraded, or maintained for offloading purposes. This information set and its purpose is much different than standard network analytics.

Embodiments address the need of wireless service providers to have more visibility over the effects of offloading solutions and specific policies. Hence the advanced profiling dashboard 115 displays analytics which assess offloading solutions and offloading policies 590, 591, 592, 593, 594, 595, 596 from the policy manager 130 and modified policies 740, 741, 742, 743, 744, 745, 746, 747 from the advanced profiling client 120. Devices 140, third party data sources 150 and policy managers 130, and/or advanced profiling clients 120 record device performance results relative to the policies 590, 591, 592, 593, 594, 595, 596 and 740, 741, 742, 743, 744, 745, 746, 747 being enforced. This allows the advanced profiling server 110 to build advanced profiles 406, 407, 408, 409, 410, 411 that assess the performance of these specific policies. The policy assessments are then displayed to the user over the advanced profiling dashboard 115 user interface.

As an example, consider a set of connection managers (device controllers 220) that are using a policy stating that they should connect to access network X after 5 pm if possible. The intention of this policy is to alleviate congestion on the home network of those devices that is consistently getting bogged down at 5 pm. It may happen then that so many devices connect to access network X at 5 pm that access network X becomes more congested than the wireless service provider's home network. In this case, the devices that have been switched onto this alternative network will receive a worse network connection than they otherwise would have. In this scenario, which is likely to upset users, the performance results of access network X and the policy being used would be reported to the advanced profiling server 110. Access point profiles 406 would then be generated and displayed to the wireless service provider over the advanced profiling dashboard 115 user interface depicting this policy issue. The wireless service provider can then see that their policy is not working well, and in response input policy changes to rectify the problem. As an example, the newly modified access point policy 740 may dictate that only 50% of available users should connect to access network X at 5 pm.

Embodiments address wireless service providers' need for more network information while designing appropriate offloading policies 590, 591, 592, 593, 594, 595, 596. Currently, network analytics are not tied into offloading solutions which makes it impossible to perform appropriate "what if" analysis on policies that wireless service providers are considering deploying. The embodiment allows for a "what if" analysis and makes suggestions to the wireless service provider as to how they should design their offloading policies. This aspect of the embodiment is a policy design and testing interface.

As an example, consider a wireless service provider who is trying to offload more of their network's data flow at 5 pm to alleviate congestion. There may be dozens of access networks that they could choose to move users to as a first priority. Setting this policy is an important decision for wireless service providers since all devices that are trying to offload their data will look for this network first. Hence, it is likely that many users will use the first priority network. Despite the importance of appropriately setting this policy, the wireless service provider has no way of knowing which alternative network is the best choice. Using the enclosed embodiment, the wireless service provider could assess access point profiles 406 and connection profiles 411 relative to the available network options, over the advanced profiling dashboard 115. The user input and policy modification interface 720 can then be used to perform a "what if" analysis and suggest to the user which alternative network is likely the best choice as a top priority roaming option. This particular network option may be chosen, for example, because it has been delivering the best quality of service to users, has the most capacity to accept more data, or because other policies that use of this particular network are performing well.

Figure 8:
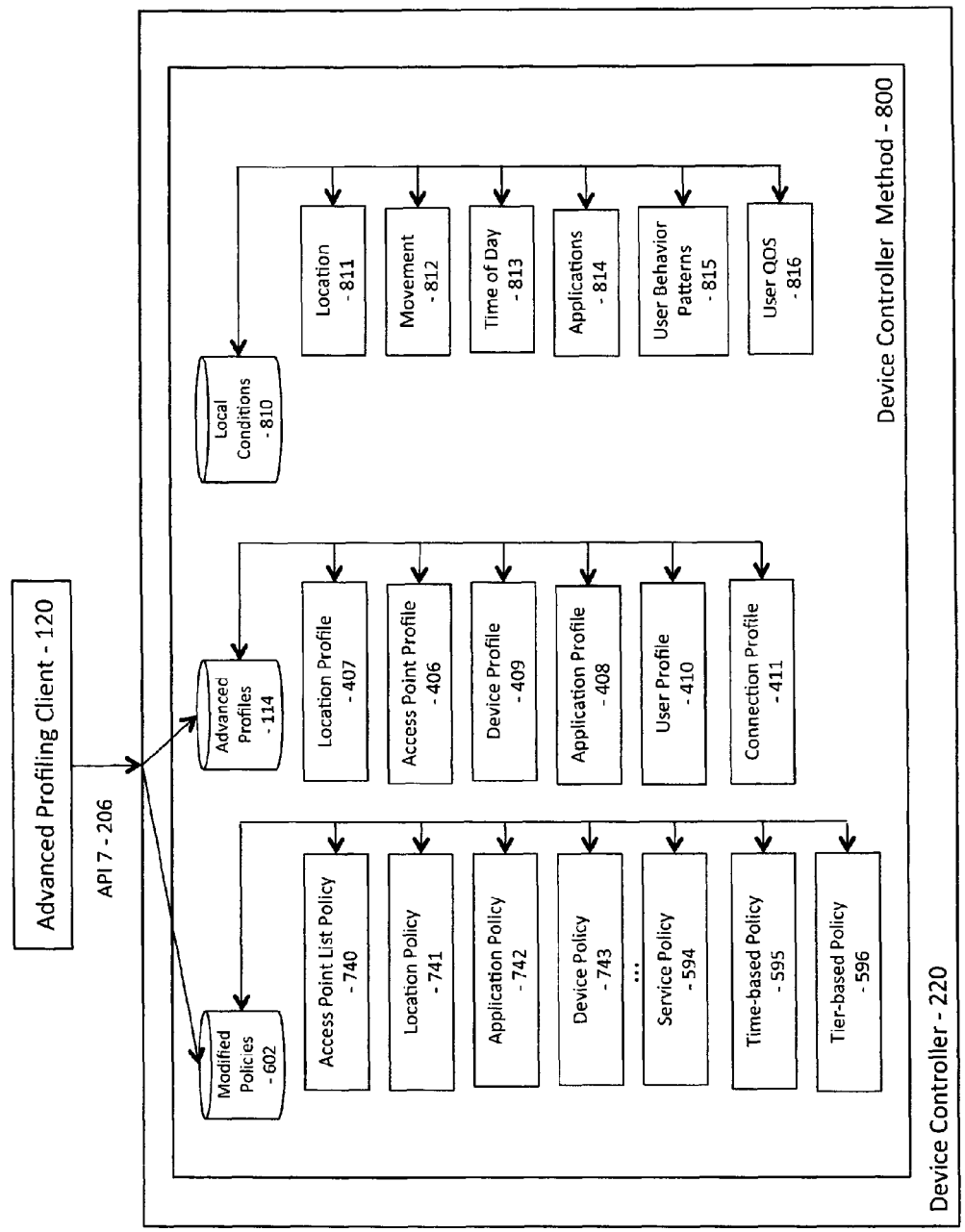
FIG. 8 illustrates one example embodiment of a device controller method.

FIG. 8 depicts one example embodiment of a device controller 220 for appropriately enforcing policy. The device controller method 800 considers, although is not limited to, policies 501, advanced profiles 114, local conditions 810, and the like. The example embodiment of a device controller 220 utilizes an advanced process to determine preferable functionality and operation of a device 140. This method takes advantage of advanced profiles 114 from the advanced profiling server 110, policies 501 from the policy manager 130, and localized, real-time conditions observed by the device 140. Included in the set of advanced profiles 114 are the local conditions 810 of every other device controller 220 relevant to this device controller method 800. Local conditions 810 observed by the user equipment that are considered in the method include, but are not limited to, the location 811 of the device 140, the movement 812 of the device 140, the time of day 813, applications 814 operating on the device 140, user behavior patterns 815, user quality of service requirements 816, and the like.

The following are examples of how the advanced profiling server 110 uses information to create advanced profiles 114 and how the system uses them to perform specific tasks. In all cases, once the data is collected and reported to the advanced profiling server 110, analytic and statistical processes performed on the data logs 300 allows the development of advanced sets of profiles to be used by the advanced profiling client 120 and distributed to policy managers 130, device operating systems 230, and device controllers 220 to assess, guide, or otherwise inform the creation, modification, or restructuring of device polices. At any time, local offline profiles may also be stored by the advanced profiling client 120 in the profiles database 630.

In the first example, the advanced profiling server 110 performs the generation of dynamic user profiles 410. User and operational behaviors 815 may be extracted by the advanced profiling client 120 for reporting via data logs 300 to the advanced profiling server 110. Alternatively, this same information may be extracted from processes performed by the device controller 220 for reporting to the advanced profiling server 110. Additional information related to these profiles may be received from, but are not limited to, policy manager servers 130 managing the device controller 220, third party data sources 150, and user inputs 302.

One specific application of how user profiles 410 may be used in a unique and useful way in the implementation of a mobile connection manger system to enforce data offload policies based on the 60/10 Rule is outlined below. The 60/10 Rule is that the top 10% of mobile data users account for 60% of global data usage (Cisco 2010).

Given that inferior connection decisions are an inevitable consequence of using a connection manger (device controller 220), the risk of inferior connection decisions is of key concern to wireless service providers. This risk may be mitigated by using user profiles 410, which dynamically identify the largest bandwidth consumers. By amalgamating, comparing, and profiling user data usage 815 in semi real-time, connection mangers (device controller 220) may take advantage of the power law distribution of bandwidth consumption. In this way, users may be prioritized for offload based on their current impact on the network and less users total are required for offloading to achieve desired results. Additionally, the top X % of bandwidth consumers that are selected as prioritized offload candidates may be set by wireless service providers or dynamically driven by semi real-time network congestion conditions.

For simplicity, consider two users experiencing network congestion: one is a heavy bandwidth consumer, the other is not. Without dynamically profiling these particular users, both will become offload candidates and therefore they are both at risk of connecting to an inferior network. If however these users are profiled, only the heavy bandwidth consumer will be initially offloaded. This reduction in consumption itself may be sufficient to allow the small bandwidth consumer to begin experiencing their required improvement to quality of service. In the event that focused offloading of the heavy bandwidth users cannot rectify network congestion and performance, all users will become offload candidates. For example, if poor quality of service is being created by malfunctioning or damaged cellular infrastructure then offloading a subset of the users may not solve the problem, and all candidates will need to be offloaded to rectify the poor service quality.

A second example is the generation of dynamic, location profiles 407, performed by the advanced profiling server 110. The device controller 220 may benefit from location profiles 407 created from data including, but not limited to, location, location specific device controller 220 performance measures, signal strengths, network topologies, network characteristics, the quality of decisions made by device controller 220, and the general wireless/network environment. This data may be extracted by the advanced profiling client 120 for reporting to the advanced profiling server 110 via logs 300. Alternatively, the advanced profiling server 110 may receive this same information extracted from, for example, a device controller 220, third party data sources 150, and user inputs 302. Additional location and topology information may be extracted from databases held by, for example, wireless service providers or other map databases at the discretion of the wireless service provider.

One specific example of how location profiles 407 may be used in a unique and useful way in the implementation of a mobile connection manger system to enforce data offload policies is outlined below.

The repeated establishing and breaking of network connections that occurs if an appropriate connection cannot be maintained for a reasonable amount of time is called network ping-pong. This often occurs as a result of devices moving in and out of range of adequate signal strengths. The system improves connection decisions over time by systematically characterizing locations based on the quality of connection decisions made by connection manager (device controller 220) while in these areas. Consider an office building with many Wi-Fi hotspots. Due to the nature of these locations, clients are often in range of the access points 160 for long enough to avoid experiencing network ping-pong. Over time, connection managers (device controllers 220) are likely to report a tendency for connection decisions to Wi-Fi access points in this area to be of high quality. This location would then be labeled as appropriate for data offloading to improve the information available to advanced profiling client 120, connection manager (device controller 220), offload controller (policy manager 130), and/or the advanced profiling server 110. Connections with an equal or greater quality of service in comparison to alternative offload access points that are maintained for a period of time are labeled as high quality or high value connections.

Now consider an urban location that has historically produced unpredictable wireless signal strengths. In this zone, wireless signal strengths are sensitive to movement, user location, and wireless device orientation. Network ping-pong in urban locations is common because connection decisions tended to be of low quality. As a result, this area would be labeled as being an inappropriate region for data offloading.

The third example is the generation of dynamic access point profiles 406 performed by the advanced profiling server 110. Location, historical average performance, historical average throughput measures, historical average latency measures, estimated range, and general characteristics are all extracted and reported to the advanced profiling server 110 via data logs 300. All of the data is then labeled relative to the device 140 taking the reading, access point technology, network details, time of day, usage behaviors, subscription profile and location, and the like to provide context. This information may be extracted by the advanced profiling client 120 for reporting to the advanced profiling server 110. Alternatively, the advanced profiling server 110 may receive this same information from device controllers 220. Wireless service providers, users, and third party data sources 150 at the discretion of the wireless service provider may provide additional network information.

Access point profiles 406 are utilized to classify the plurality of access points detected by the advanced profiling clients 120, device operating systems 230, and/or device controllers 220. Access point profiles 406 are constructed from an aggregate of data. This data comprises of, but is not limited to:
  access point basic service set identification (BSSID).
  service set identifier (SSID) of the network connected to the access point.
  received signal strength indication (RSSI) of the access point.
  network throughput.
  network latency.
  authentication, key management, and encryption schemes supported by the access point.
  frequency of the channel over which the client is communicating with the access point.
  location of the access point.

One specific example of how access point profiles 406 may be used in a unique and useful way in the implementation of a mobile connection manger system to enforce data offload policies is outlined below.

A successful connection, in the preferred embodiment, is one that is maintained for a reasonable amount of time with equal or better quality of service in comparison to alternative offload access points. A failed connection is one that does not meet one of the said conditions.

The logging of past successes/failures with respect to connection attempts is an essential component for characterizing specific access points provided that the context of the success/failure is also recorded. By analyzing the success/failures of connection attempts with respect to time of day, running applications, mobility, location, device, or other available measures, a comprehensive profile of the access point 160 can be constructed. For example, if connections generally fail while throughput intensive applications are running, the system can extrapolate that the access point 160 and, in particular, the access network at that particular time cannot handle heavy throughput. If connections generally fail during a specific time of day, it can extrapolate that during this time of day, congestion is particularly high on the said access network. For example if connections generally fail when Android devices attempt to connect to the access network, the said devices may not be compatible with the access point.

The analysis and statistical processing of past successful and failed connections with respect to the associated context and characteristics of the device at that particular time provides one piece of the overall access point profiles 406, which may be used to improve connection decisions. The analytics are also of key interest to wireless service providers and network managers seeking to optimize the access networks. Currently some connection managers (device controllers 220) provide the logging of successful and failed connections as an offline capability with minimal or no context provided. Using an advanced profiling server 110, connection managers (device controllers 220) are able to share this information with other devices and networks to improve overall performance through the advanced profiling client 120.

In the fourth example, device controllers 220 often operate on systems with running applications 560 that must be managed by the device controller 220 to ensure effective operation. The generation of dynamic application profiles 408 is performed by the advanced profiling server 110. Technical/device requirements, network requirements, normal user behaviors, and the like are extracted and recorded in data logs 300 while the application 560 is in use by the device 140. This information may be extracted by the advanced profiling client 120 for reporting to the advanced profiling server 110. Alternatively, the advanced profiling server 110 may receive the said information from device controllers 220, third party data sources 150, user inputs 302, wireless service provider database, or application developers at their discretion.

One specific example of how application profiles 408 may be used in a unique and useful way in the implementation of a mobile connection manger system to enforce data offload policies is outlined below.

The majority of current connection manager (device controller 220) policies related to application offloading simply direct data traffic over specific access technologies and protocols. An example may be a policy to send YouTube data over Wi-Fi whenever possible. This policy does not incorporate an important aspect of network performance and the more specific requirements to effectively run applications on wireless devices 140.

Applications 560 have different priorities in terms of, for example, network latency and network throughput requirements to provide a positive user experience (other examples are jitter and packet loss). By characterizing applications 560 based on these requirements, applications 560 may be offloaded to the access networks that most accurately meet the said requirements of a positive user experience. Currently supported application policies are expanded upon, in combination with access point profiles to provide an improvement to user experience during offload events.

With the co-operation of application developers, application profiles 408 may be taken further. Applications 560 may be profiled based on what dynamic graphical resolution reductions may be performed in response to experiencing slow network speeds to maintain a certain level of user experience.

In the fifth example, the generation of dynamic device profiles 409 is performed by the advanced profiling server 110. Technical specifications, technical capabilities, performance measures, supported networks, supported access technologies, manufacturer, model number, operating system details, installed applications, performance measures, and the like are extracted and recorded in data logs 300. This information may be extracted by the advanced profiling client 120 for reporting to the advanced profiling server 110. Alternatively, the advanced profiling server 110 may receive the said information from device controllers 220, third party data sources 150, user inputs 302, wireless service provider database, and the like. One specific example of how device profiles 409 may be used in a unique and useful way in the implementation of a mobile connection manger system to enforce data offload policies is outlined below.

Wireless service providers have incentive to use device profiles 409 to better understand the implications that various devices have on the wireless networks. These detailed profiles allow wireless service providers to compare the network consumption rates associated with each device. They also allow wireless service providers to better understand which devices are receiving the best service and are most compatible with the network infrastructure. This information may be used by wireless service providers to motivate device deployment strategies aimed at convincing consumers to use the specific devices preferred by the wireless service provider.

In the sixth example, effective load balancing requires semi real-time performance measurements of all networks available for sharing the load as well as detailed user, location, device, and/or application profiles. By understanding the state of available networks, certain networks may be prioritized for congestion reduction and others for congestion on-loading. An understanding of users is required to predict behaviors and mobility vectors as to not offload users to networks with which the user will experience a short lived connection or connection to an inferior network. An understanding of location provides an understanding of which areas within the space undergoing load balancing should be prioritized for offload. Furthermore, an understanding of devices 140 and the applications 560 running on the device operating system 230 ensures that the process of load balancing connects users to the most appropriate network for maintaining expected user experience. Load balancing dynamically and in response to semi real-time conditions requires advanced relationship profiles amongst all of the interconnected factors that participate in the load balancing. Executing a load balancing strategy that simply searches for the best fit with respect to any one of these factors by itself is a flawed model. Therefore, relationships profiles must be built and contributed to policy enforcement logic to allow the trade-offs between all factors to be considered, in order to provide the best overall user experience while adequately distributing the load.

The load balancing approach is unique in that it leverages collaboration between a policy manager 130, a dynamic advanced profiling server 110, and all available devices 140. The network offload controller (policy manager 130) provides long-standing policies, which govern the list of prioritized access points provided to connection managers (device controllers 220) and the advanced profiling client 120. Then, semi real-time network state, user behavior, location, device, running application, and the like are provided by the plurality of devices 140. The accumulation of this information from the said collection of sources may then be used by the system to most appropriately offload devices 140 in order to balance the load across the network.

Prior art in connection management largely considers load balancing to be a non-real-time process. In this model, the offload controller (policy manager 120) may make occasional modifications to the list of prioritized networks in order to avoid having all users attempt to connect to the same access network as a first priority. However, this policy is static. After the policy is delivered to the device 140, the policy is strictly enforced until encountering an update event. Its enforcement is not subject to the states of dynamic variables. Static policies are ineffective at providing a means of load balancing in semi real-time.

Specific examples referring to FIGS. 1 to 8 are now given. The advanced profiling client 120 may or may not be integrated directly into the device 140. If it is not, then the device 140, device controller 220, or an application 560 must perform quality of service tests. If the advanced profiling client 120 is integrated into the device 140, then the advanced profiling client 120 may provide these functions. The method of delivery and use of policies is case dependant and may include the methods defined by ANDSF, HotSpot2.0, GAS, ANQP, IEEE 802.11u, IEEE 802.11v as well as other IEEE 802.11 standards, pre-loaded connection managers, or systems where there is no direct communication between policy manager 130 and connection manager (device controller 220).

The first example of access point measurements is given. Devices 140, which may be wireless devices or network access points, routinely perform latency, throughput, and other connection tests to evaluate the standard of connection quality. Information shown in the list below, which includes but is not limited to the access point data 400, is passed to the advanced profiling server 110, where it is processed in combination with any third party data sources 150 to form access point profiles 406. The advanced profiling client 120 then uses the access point profiles 406 to modify access point priority list policies 590 from the policy manager 130 in such a way that improves their performance as part of a data offload solution. These modified policies 602 are then passed to the device 140, by either the advanced profiling client 120 or policy manager 130, for use. Access points showing superior performance are moved up in the prioritized list. Likewise, access points showing inferior performance are moved down. It this way, devices 140 using policies modified by the policy manager interface 520 will establish connections that deliver an improved quality of service to device users. Modified access point lists are passed to devices 140, by either the advanced profiling client 120 or policy manager 130, for use.

Useful Data Includes:
1. Time
2. Location
3. Connection Throughput
4. Connection Latency
5. Running Applications
6. The Reporting Wireless Device, Access Point or Network Probe Details (SDK, Device Model, OS Version, Unique Identifier, etc.)
7. Depending on Access Point being assessed, one of:
   Wi-Fi Access Point Details (SSID, BSSID, RSSI)
   GSM Access Point Details (C-ID, LAC, GSM Signal Strength)
   WiMAX Access Point Details
   Etc. . . .

The second example is for fault tracking and analysis. Devices 140, which may be wireless devices or network access points, routinely track and log past successful and unsuccessful connection attempts or errors. This information is passed to the advanced profiling server 110 where it is processed in combination with any third party data sources 150 to form connection profiles 411. The advanced profiling client 120 then uses the connection profiles 411 to modify network prioritization policies from the policy manager 130 in such a way that improves their performance as part of a data offload solution. These modified policies 602 are then passed to the device 140, by either the advanced profiling client 120 or policy manager 130, for use. Access points 160 showing superior performance with fewer errors are moved up in the prioritized list. Likewise, access points showing inferior performance with more errors are moved down. In this way, devices 140 using these modified policies 590 will attempt to establish connections known to provide improved reliability to device users. More connection attempts would be successful in this case. Modified access point lists 740 are passed to devices 140, by either the advanced profiling client 120 or policy manager 130, for use.

Useful Data Includes:
1. Time
2. Location
3. Connection Throughput
4. Connection Latency
5. Connection Attempt Results
6. Duration of Established Connections
7. The Reporting Wireless Device, Access Point or Network Probe Details (SDK, Device Model, OS Version, Unique Identifier, etc.)

In a third example of location based offload evaluation, devices 140 routinely track and log past successful and unsuccessful connection attempts, errors, and connection durations. This information is passed to the advanced profiling server 110 where it is processed in combination with any third party data sources 150 form location profiles 407. The advanced profiling client 120 then uses the location profiles 407 to modify policies 591 from the policy manager 130 in such a way that improves their performance as part of a data offload solution. These modified policies 741 are then passed to the device 140, by either the advanced profiling client 120 or policy manager 130, for use. Access points in regions known to provide more reliable service are moved up in the prioritized list. Likewise, access points in regions that know to be less reliable (with more disconnections and shorter connection durations) are moved down. It this way, devices 140 using these modified policies 602 will attempt to establish connections in regions known to provide improved reliability to device users. More connection attempts total would be successful in this case.

Useful Data Includes:
1. Time
2. Location
3. Connection Throughput
4. Connection Latency
5. Connection Attempt Results
6. Duration of Established Connections
7. Running Applications
8. The Reporting Wireless Device, Access Point or Network Probe Details (SDK, Device Model, OS Version, Unique Identifier, etc.)
9. Details of Local Access Points
   Wi-Fi Access Point Details (SSID, BSSID, RSSI)
   GSM Access Point Details (C-ID, LAC, GSM Signal Strength)
   WiMAX Access Point Details
   Etc. . . .

In a fourth example of application based offload evaluation, devices 140 routinely track the performance of applications and application specific network requirements for a positive user experience. This information, which includes but is not limited to the data shown in the list below, is passed to the Advanced Profiling Server 110 where it is processed in combination with any third party data sources 150 to form application profiles 408. The advanced profiling client 120 then uses the application profiles 408 to modify access point list policies 590 from the policy manager 130 in such a way that improves their performance as part of a data offload solution. These modified policies 740 are then passed to the Device 140, by either the advanced profiling client 120 or policy manager 130, for use. When a device is looking for a network to use, access points 160 that are most appropriate for the running application 560 on device 140 are moved up in the prioritized list. Likewise, access points 160 known to provide worse service to the running application 560 are moved down the list. In some cases, the re-prioritization of access points will be based on what applications 560 the device normally uses and not what application 560 the device is using at the given point in time. In this way, devices 140 using these modified policies 740 will attempt to establish connections known to provide improved service quality for those applications normally used by the device user. Modified access point policy lists 740 are passed to devices 140, by either the advanced profiling client 120 or policy manager 130, for use. In some embodiments, multiple prioritized lists will be sent to devices, device controllers, or advanced profiling clients. Each prioritized list will be relevant to certain types of applications. When a device wants to connect to an access point, the chosen list to use will depend on currently running applications.

Useful Data Includes:
1. Time
2. Location
3. Connection Throughput
4. Connection Latency
5. Connection Attempt Results
6. Duration of Established Connections
7. Running Applications
8. Application Data Usage Rates
9. Application Network Requirements
10. The Reporting Wireless Device, Access Point or Network Probe Details (SDK, Device Model, OS Version, Unique Identifier, etc.)

In a fifth example, user specific offloading policy, devices 140 routinely track user specific information, including their behavioural trends and individual network requirements for a positive user experience. This information is passed to the advanced profiling server 110 where it is processed in combination with any third party data sources 150 and user subscription information 585 to form user profiles 410. The advanced profiling client 120 then uses the user profiles 410 to customize policies from the policy manager 130 for specific users in such a way that improves their experienced service quality when offloaded. Further, users in this example may purchase subscription packages that would influence the policies that they receive. These modified policies 602 are passed to the device 140, by either the advanced profiling client 120 or policy manager 130, for use. As an example, consider a user who has purchased a premium data offload package. In this case, the advanced profiling client 120 may be used to modify the access point list policy 590 of that specific user in such a way that provides them with improved service quality over non-premium users. Highest quality access points 160 would be ranked high in the priority lists of premium users. Whereas these access points may be low in the list or excluded from the network priority list policies of non-premium users. Another example may simply be ranking user preferred or user owned access points higher on that user's specific network priority policy list.

Useful Data Includes:
1. Time
2. Connection Throughput
3. Connection Latency
4. Running or Installed Applications
5. Application Data Usage Rates
6. Application Network Requirements
7. User Unique Identifier (MAC Address, IMSI, etc.)
8. The Reporting Wireless Device, Access Point or Network Probe Details (SDK, Device Model, OS Version, Unique Identifier, etc.)

In the sixth example, user suggestions for improving performance, access point list policies 590 or modified access point list policies 740 may be delivered to devices 140 or connection managers (device controllers 220), by either the advanced profiling client 120 or policy manager 130, for use. Access point list policies 590/740 may then be visually displayed to users either in a list or on a map so that users may see where they are relative to highest quality access points. In this way, users know where to go to get better quality of service. These lists may be displayed over the advanced profiling client 120 if it is present on the device, otherwise they may be displayed by a connection manager (device controller 220) or a third party application 560.

Useful Data Includes:
1. Time
2. Location
3. Connection Throughput
4. Connection Latency
5. Running or Installed Applications
6. Application Network Requirements
7. The Reporting Wireless Device, Access Point or Network Probe Details (SDK, Device Model, OS Version, Unique Identifier, etc.)
8. Details of Local Access Points
   Wi-Fi Access Point Details (Location, Load, SSID, BSSID, RSSI, etc.)
   GSM Access Point Details (Location, Load, C-ID, LAC, GSM Signal Strength, etc.)
   WiMAX Access Point Details (Location, Load, etc.)
   Etc. . . .

In the final example, load balancing and load management, devices 140 provide wireless service providers with a sense of load, quality of service, and congestion across their networks. Wireless service providers, depending on the case, may use processes outside the scope of this embodiment to understand their networks, otherwise they may leverage access point profiles 406 and connection profiles 411 provided by this embodiment. The advanced profiling client 120 can then use network load, quality of service, and congestion information to modify policies 501 from the policy manager 130 to perform load balancing and load management. For example, if an access point is overloaded with network traffic, it will be moved down the modified access point policy list Policy 740. Hence, that access point will receive fewer new connections to support. Likewise relatively unloaded access points may be moved up the list. In this way, network connection priority policies may be modified to perform load balancing and load management.

Useful Data Includes:
1. Time
2. Location
3. Connection Attempt Results
4. Duration of Established Connections
5. Connection Throughput
6. Connection Latency
7. Running or Installed Applications
8. Application Network Requirements
9. Application Data Usage Rates
10. Unique User Identifier (MAC Address, IMSI, etc.)
11. The Reporting Wireless Device, Access Point or Network Probe Details (SDK, Device Model, OS Version, Unique Identifier, etc.)
12. Details of Usable Access Points
    Wi-Fi Access Point Details (Location, Load, SSID, BSSID, RSSI, etc.)
    GSM Access Point Details (Location, Load, C-ID, LAC, GSM Signal Strength, etc.)
    WiMAX Access Point Details (Location, Load, etc.)
    Etc. . . .

Figure 9:
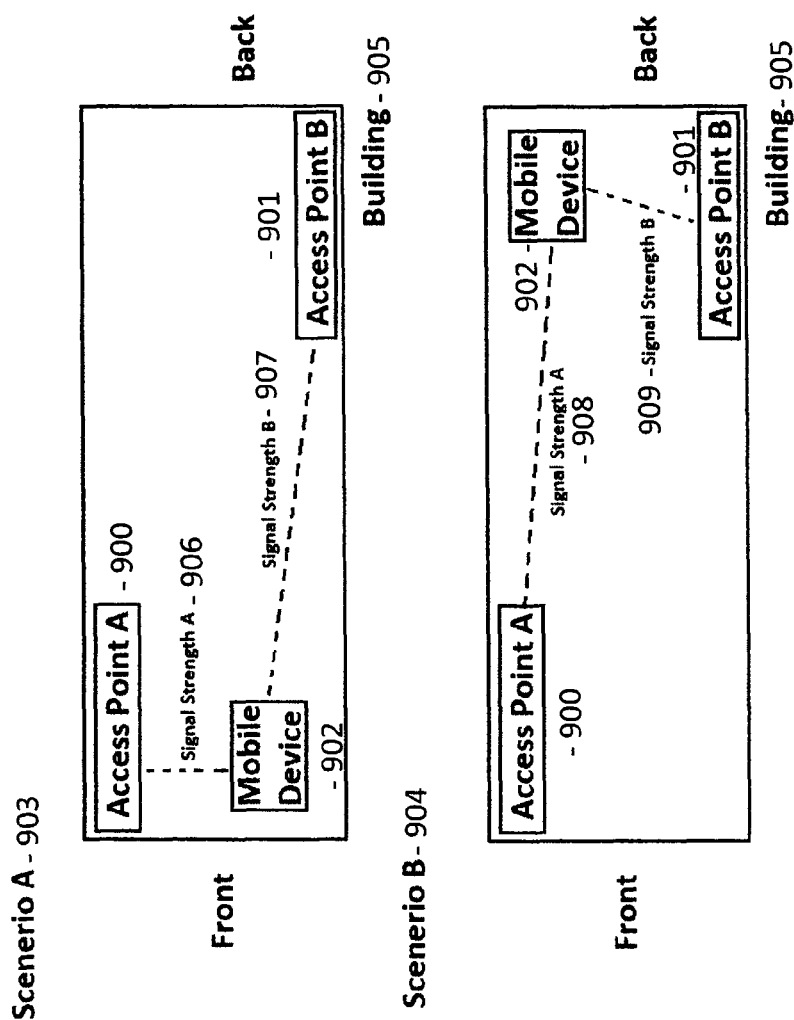
FIG. 9 depicts two scenarios of a wireless device's location within a building with two Wi-Fi access points.

FIG. 9 depicts two scenarios of mobile device 902 location within a building 905 with two Wi-Fi access points 900, 901. If the mobile device 902 attempted to determine its location using GPS, cellular triangulation, or Wi-Fi triangulation, it is possible and common that both Scenario A 903 and B 904 would return the same location value for the mobile device 902, despite the fact that the location is quite different. Alternatively, the location determined from these approaches may be too far off from actual location to be useful for offloading and policy enforcement processes.

In both Scenario A 903 and B 904, Access Point A 900 provides excellent service at the front of the building and terrible service at the back. Likewise, Access Point B 901 provides excellent service at the back of the building and terrible service at the front. Hence determining location of the user, which we have determined is problematic, is crucial for determining which access point to connect to. This embodiment proposes an approach that does not require the user's absolute geographic location; instead, it requires relative wireless location.

In Scenario A 903, let Signal Strength A 906=AA
In Scenario A 903, let Signal Strength B 907=AB
In Scenario B 904, let Signal Strength A 908=BA
In Scenario B 904, let Signal Strength B 909=BB
If:

Scenario A 903 occurs, the mobile device 902 connects to Access Point A 900, and experiences good quality of service.

Scenario A occurs, the mobile device 902 connects to Access Point B 901, and experiences poor quality of service.

Scenario B occurs, the mobile device 902 connects to Access Point B 901, and experiences good quality of service.

Scenario B occurs, the mobile device 902 connects to Access Point A 900, and experiences Poor quality of service.

Then, once these results are processed by the analytic systems of this invention, the connection matrix 1000 of mobile device 902—depicting which access point 900, 901 to connect to—would then be as shown in FIG. 10. This matrix system can be extended to include any number of access points 900, 901 and mobile devices 902. Hence, all mobile devices 902 help to build upon a connection matrix 1000, or series of connection matrices, so that they may all leverage the experiences of the other mobile devices 902. When a mobile device 902 scans its environment, it receives back a series of access point identifiers (BSSID, SSID, etc.) and the Signal Strength (RSSI, etc.) from those access points 900, 901. The access points 900, 901 and their associated signal strengths 906, 907, 908, 909 are then compared to the connection matrices 1000. If there is a match within X % accuracy, then the policy action 1001 to connect or not to connect to a particular access point 900, 901 will be eligible for use. Hence, this approach never requires determining geographic location; instead, it utilizes a relative location to the wireless environment. This same system may be extended to incorporate any number of other variables including time of day 1003, application being used 1002, the specific user's profile 1004, etc. In essence, all variables for effective offloading could be applied using this system. As well, all profile types described could be built using this method. In addition, the X % match requirement, to perform the policy action 1001, would apply to the full set of policy conditions 1005. This system and approach may be extended to systems that determine when targeted marketing messages and other location based services should be pushed to mobile devices.

FIG. 11 describes how to:
a) Define QoS classes 1106, 1107, 1108, 1109 that reflect an aggregation of the measures that affect QoS.
b) Classify traffic as belonging to one such QoS class depending on an aggregation of the measures 1105 that define the quality of that traffic.
c) Produce mappings 1300 that will allow devices to translate these broadcasted classes into connection quality estimations 1302, 1303. This will allow a device to estimate the quality of a particular connection before connecting.

Referring to FIG. 11, multiple QoS measures are collected from Wi-Fi access points. These may include, but are not limited to: throughput, latency, jitter, and packet loss. For classification purposes, initial weights and averages may be selected. For simplicity, this example will only consider measure types 1100 of throughput and latency. This process describes one process for classification that would be covered by this embodiment.

Hence, this example is not intended to limit the scope of the embodiment to this particular process or the use of only two variables.

Now consider a connection quality report that indicates that a user received a measured value 1103 of 1000 Kbps and 50 ms latency. Assume that this one report does not affect the averages. The final value 1105 is calculated as shown. This is just one class value; one could be calculated for each QoS report. Depending on how many classes 1106, 1107, 1108, 1109 are required, ranges will be established for classification. FIG. 11 shows 4 classes as an example classification scheme for an access point's quality.

However, through an analytic iterative process, if it's determined that users' connections to class 1 1106 access points are often having a worse experience than classes 2, 3 or 4 (1107, 1108, 1109), then it can be determined that the weightings 1101 used to determine the classifications must be refined. Otherwise, the classification system may need to be made specific to the application currently being used on the wireless device. These scenarios would be directly addressed by the analytic processes of this embodiment.

Service providers require mappings to interpret these broadcasted class values 1106, 1107, 1108, 1109. It may be that for their particular users, devices, applications, etc. that they have unique network requirements. Hence, they may benefit from an analytic process which generates a mapping, or a set of mappings, which works best for their users.

For example, the value of 13.8 which was calculated above, may on an average basis, be interpreted by devices as meaning that connections will provide 13.8% better throughput than average, and 13.8% better latency than average. However, this is not likely to be the case. The wireless service provider may determine that this value is too high or too low compared to the experience that their customers are receiving. Likewise, the wireless service provider may determine that the classification system is using weightings 1101 that they do not agree with, in which case they will need to map how to translate these values into a QoS estimate that is useful for their users, devices, applications, etc.

Consider an access point that broadcasts a class value of 20, as an example, to wireless devices. Now, if a wireless service provider determines that their users only experience roughly 10% better than normal performance on this access point instead of 20%, they would apply a mapping of minus 10. Subtracting 10 from the Class Value will be the first mapping.

Now, say a wireless service provider looks closer and determines that their users are receiving 10% worse latency than average and 20% better throughput than average. A further mapping for this access point may be determined using weighted values.

$$\text{Value} = \frac{\sum\limits^{N} (\text{Measure Weight} \times \text{Measure \% from } AVG)}{\sum\limits^{N} (\text{Measure Weight})}$$

$$10 = \frac{(-10 \times x)_{Latency} + (20 \times y)_{Throughput}}{x + y}$$

Now, since we're looking for relative values, let $$10 = \frac{(-10 \times 1)_{Latency} + (20 \times y)_{Throughput}}{1 + y}$$

$$y = 2$$

Using a weight of 1 for latency, and a weight of 2 for throughput will be the second mapping.

Please note that the process of substituting x=/into the equation to determine the relative weight values only works because we are considering two variables (i.e. throughput and latency). If more than two variables are being considered, more sets of known QoS readings and their associated class values must be considered together in order to solve the system of equations and determine the weight values.

Hence, after the two mappings the service provider's combined mapping—through an ongoing iterative process—has become:

Measure % from $AVG_i$ =

$$\frac{(\text{Value} - \text{Mapping}) \times \sum\limits^{N} (\text{Measure Weight}) - \sum\limits^{N-1} (\text{Measure Weight} \times \text{Measure \% from } AVG)}{(\text{Measure } Weight)_i}$$

Eg.

% from average throughput estimate =          Equation #1

$$\frac{(\text{Value} - \text{Mapping}) \times (x+y) - \frac{(\text{\% from average latency estimate}) \times x}{y}}{} =$$

$$\frac{(\text{Value} - 10) \times (1+2) - \frac{(\text{\% from average latency estimate}) \times 1}{2}}{}$$

% from average latency estimate =          Equation #2

$$\frac{(\text{Value} - \text{Mapping}) \times (x+y) - \frac{(\text{\% from average throughput estimate}) \times y}{x}}{} =$$

$$\frac{(\text{Value} - 10) \times (1+2) - \frac{(\text{\% from average throughput estimate}) \times 2}{1}}{}$$

Now if a device is trying to determine whether or not it should connect to an access point of a particular broadcasted class value, this system of equations may be solved to determine an estimate of the throughput and latency that would be received over that connection. This mapping has therefore given the device a better sense of whether or not the connection would be appropriate.

Please note that this is merely an example of the analytics processes covered by this embodiment for determining appropriate QoS profiles, QoS classification schemes, and service provider QoS mappings. In general, analytic processes that leverage information from multiple data sources or devices to perform an ongoing iterative refinement process to solve for these items is covered by the embodiment.

FIG. 12 describes how to:

a) Define congestion classes 1206, 1207, 1208, 1209 that reflect an aggregation of the measures 1200 that affect congestion.

b) Classify traffic as belonging to one such congestion class 1206, 1207, 1208, 1209 depending on an aggregation of the measures 1205 that define the congestion of that traffic.

c) Produce mappings that will allow devices to translate these broadcasted classes 1206, 1207, 1208, 1209 into connection quality estimations. This will allow a device to estimate the quality of a particular connection before connecting.

We have previously discussed supporting this need by broadcasting QoS classes; however, it is equally possible to support the need for pre-connection estimations by broadcasting classes 1206, 1207, 1208, 1209 of access point and access network congestion.

In this application, QoS broadcasts differ from congestion broadcasts in how they are expressed and interpreted. QoS is usually defined in terms of network measures such as throughput, latency, etc. Congestion, on the other hand, is expressed in term of how much traffic is running through the access point or what percent of the total access point or network's capacity is being used.

Hence, analytic processes will be required to determine how to best combine several congestions measures 1200 into one class value 1205 which is representative of total congestion. Further, analytic processes will be required to determine a system for mapping how downlink IP traffic congestion classes can be best translated into over-the-air IEEE 802.11 traffic QoS estimations. This mapping is likely to be wireless service provider specific and may need to be transferred to the device for use. This mapping will allow devices to interpret the congestion broadcasts and estimate what their likely IP traffic quality would be after a connection is established.

Multiple congestion measures 1200 are collected from Wi-Fi access points and network management systems. These may include—but are not limited to—percent of total rated bandwidth being used, how close latency is to a limit of what is acceptable, how many users are connected, etc. This process describes one process for congestion classification that would be covered by this embodiment. Hence, this two variable example is not intended to limit the scope of the embodiment to this particular process or the use of only two variables.

Now consider a congestion report that indicates that the network is 9/10 the way to reaching limit X and 8/10 the way to reaching limit Y. Depending on how many congestion classes are required, ranges will be established for classification. FIG. 12 shows 4 classes 1206, 1207, 1208, 1209 as an example classification scheme for an access point's congestion.

However, through an analytic iterative process, if it's determined that users' connections to class 1 1206 access points are often having a worse experience than classes 2, 3 or 4, (1207, 1208, 1209) then it can be determined that the weightings 1201 used to determine the classifications must be refined. These scenarios would be directly addressed by the analytic processes of this embodiment.

Wireless service providers require mappings to interpret these broadcasted congestion class 1206, 1207, 1208, 1209 values and translate them into connection QoS estimations. It may be that for their particular users, devices, applications, etc. that they have unique network requirements. Hence, they may benefit from an analytic process which generates a mapping, or a set of mappings, which works best for their users.

FIG. 13 shows mapping congestion class 1206, 1207, 1208, 1209 values into connection QoS estimations which may require considering the access point or access network's details, the wireless device and its radio type, the device's proximity to the access point, the user's intended action to be carried out of the network, etc.

The example just considers expected connection throughput 1302 and latency 1303 and shows an example mapping 1300. If an access point which broadcasts a particular congestion class value 1205 provides QoS measures after connection which aren't consistent with this mapping 1300, then the service providers mapping scheme would be refined to reflect this. That mapping change may, as an example, reflect the mapping processes presented for QoS mappings previously.

If a device is trying to determine whether or not it should connect to an access point of a particular broadcasted congestion class value 1205, the mapping may be used to determine an estimate of the throughput 1302 and latency 1303 that would be received over that connection. This mapping has therefore given the device a better sense of whether or not the connection would be appropriate.

Figure 14:
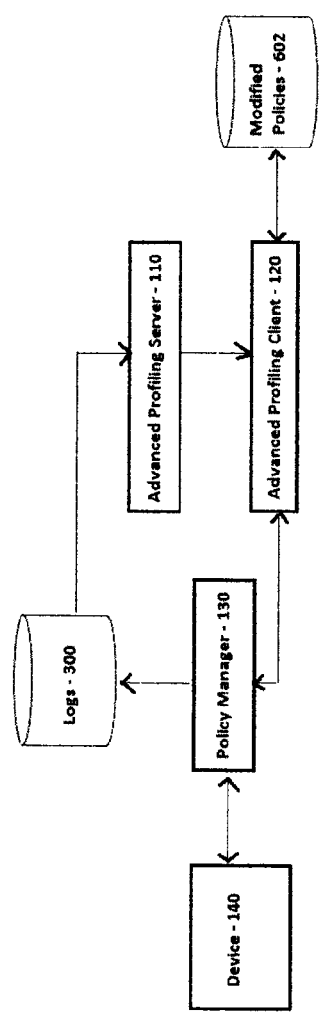
FIG. 14 depicts the simplest embodiment of the invention being used.

FIG. 14 depicts the simplest embodiment of the invention being used to improve device network connection decisions by supplying modified access point priority lists. The Device 140 performs network quality of service measurements and reports these logs 300 to the Policy Manager 130. The Policy Manager then stores these logs 300 in a database. Afterwards, the Advanced Profiling Server 110 pulls these logs 300 and generates Advanced Profiles 114 that are then passed to the Advanced Profiling Client 120. The Advanced Profiling Client 120 then generates access point priority lists and stores them in the Modified Policies Database 602.

If the Device 140 would like to determine which access point it should connect to, it passes either its location or the BSSIDs, SSIDs, and RSSIs of the nearby access points to the Policy Manager 130. The Policy Manager 130 then asks the Advanced Profiling Client 120 to prioritize these access points and send back the resulting list. The Advanced Profiling Client 120 does this by querying for the appropriate Modified Policy 602 from the database. Once this list is passed back to the Policy Manager 130, the Policy Manager 130 distributes it to the Device 140 for use.

In this embodiment, it is possible that the Policy Manager 130, Advanced Profiling Server 110, and Advanced Profiling Client 120 will be implemented on the same server. Likewise, it possible for the Logs 300 and Modified Policies 602 to be held in the same database. Further, this aggregate database could be held on the same server as the Policy Manager 130, Advanced Profiling Server 110, and Advanced Profiling Client 120. In some cases, this embodiment will be used to exclusively manage access point priority policies.

Figure 15:
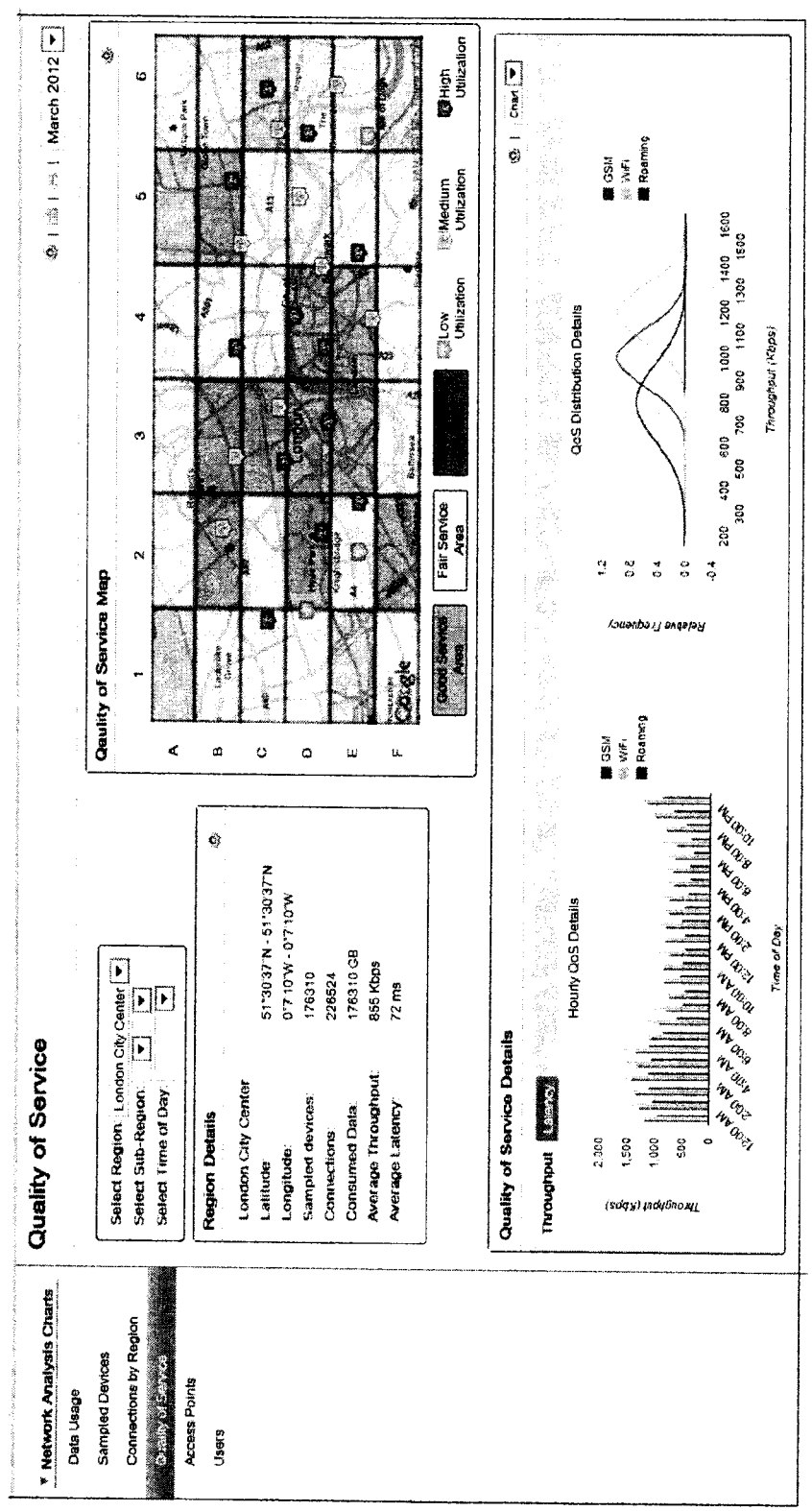
FIGS. 15 through 20 show examples of dashboard user interfaces.

FIG. 15 shows a possible dashboard 115 user interface for quality of service. Quality of service, as measured by handsets, is often quite different than when measured at the access point or network layer. This is often a result of wireless interference and packet loss. User actions that fail because packets do not reach the access point are difficult to identify at the network layer.

Figure 16:
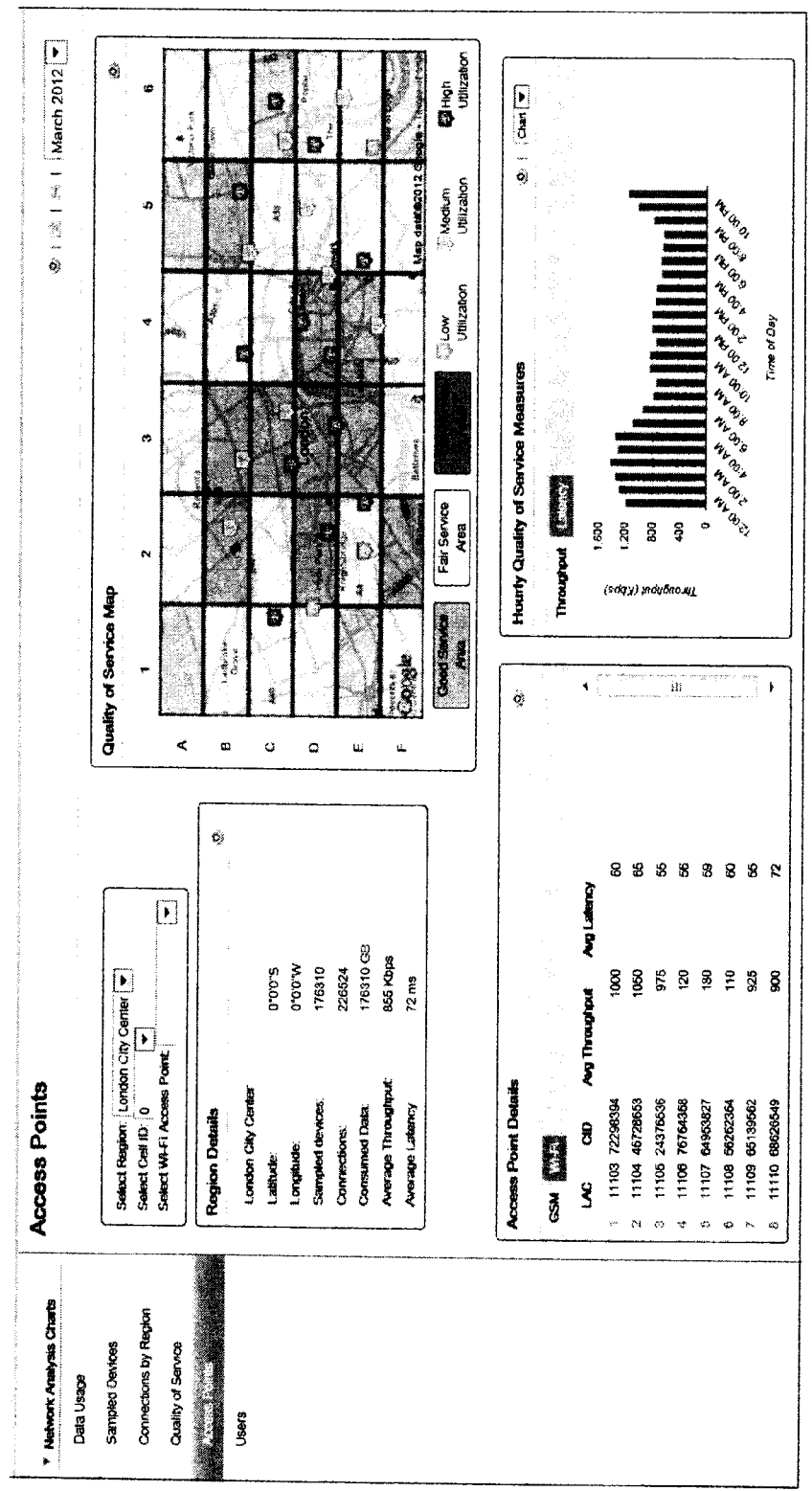

FIG. 16 shows a possible dashboard 115 user interface for access points. The advanced profiling client 120 routinely performs latency and throughput tests of connected access points to evaluate the standard of connection quality. This information is then shared between connection managers so that they may incorporate expected access point characteristics into their connection logic.

Figure 17:
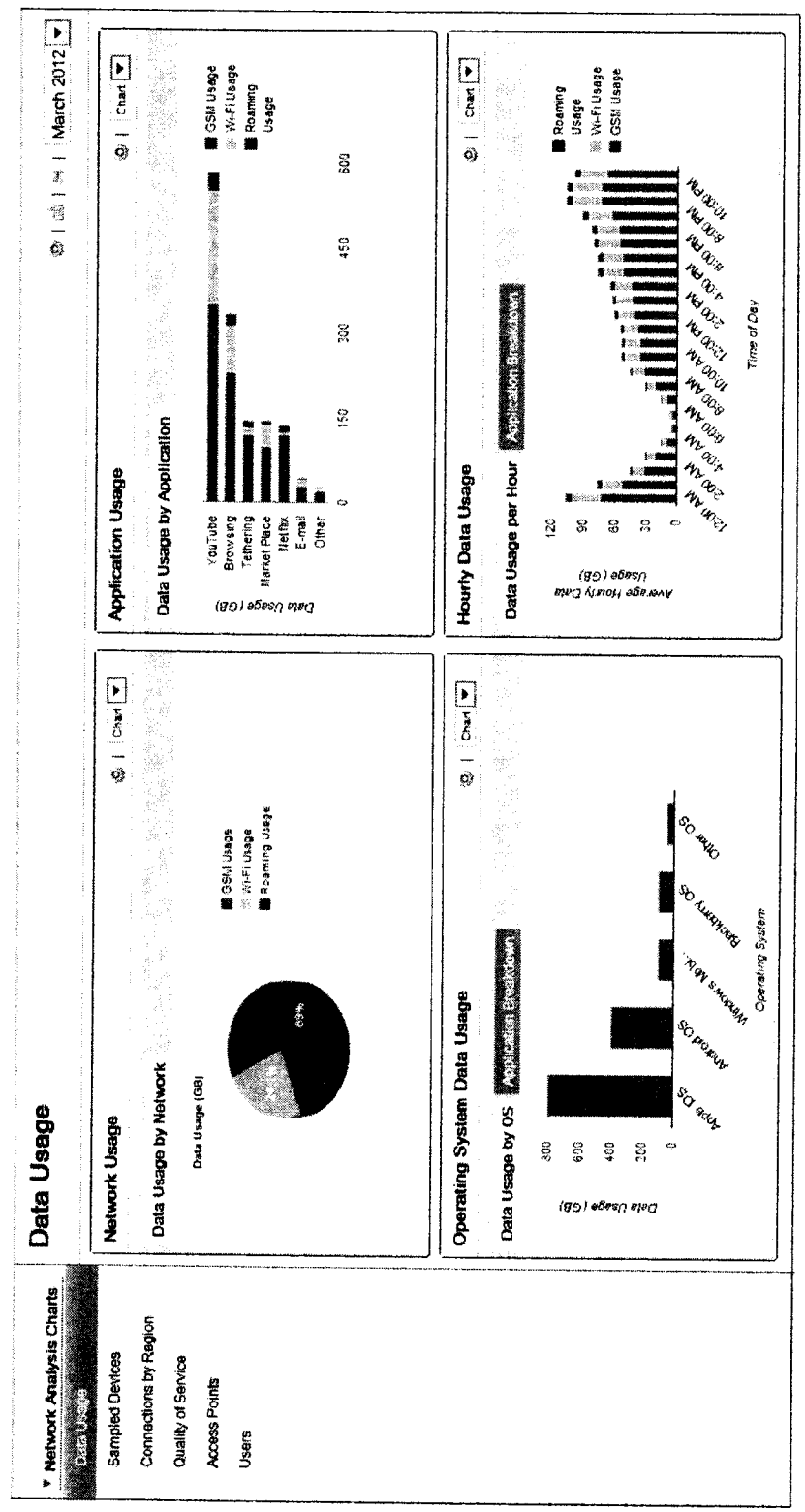

FIG. 17 shows a possible dashboard 115 user interface for data usage. The dashboard 115 allows service providers to easily view and investigate how their customers are using data and consuming bandwidth. This allows them to identify the customers who are most appropriate for offloading. It also allows service providers to design more effective upsell campaigns.

Figure 18:
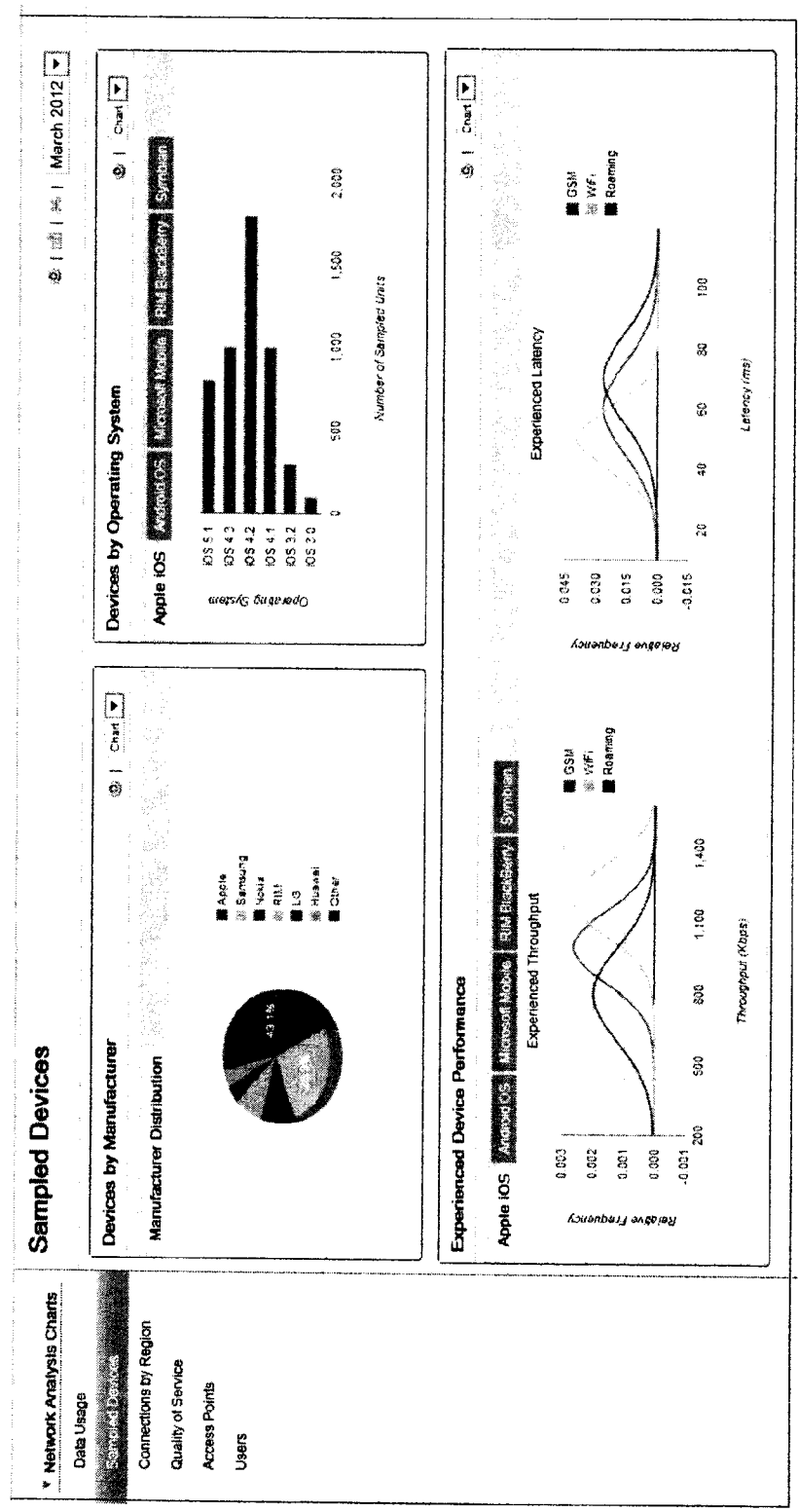

FIG. 18 shows a possible dashboard 115 user interface for showing active user devices.

Figure 19:
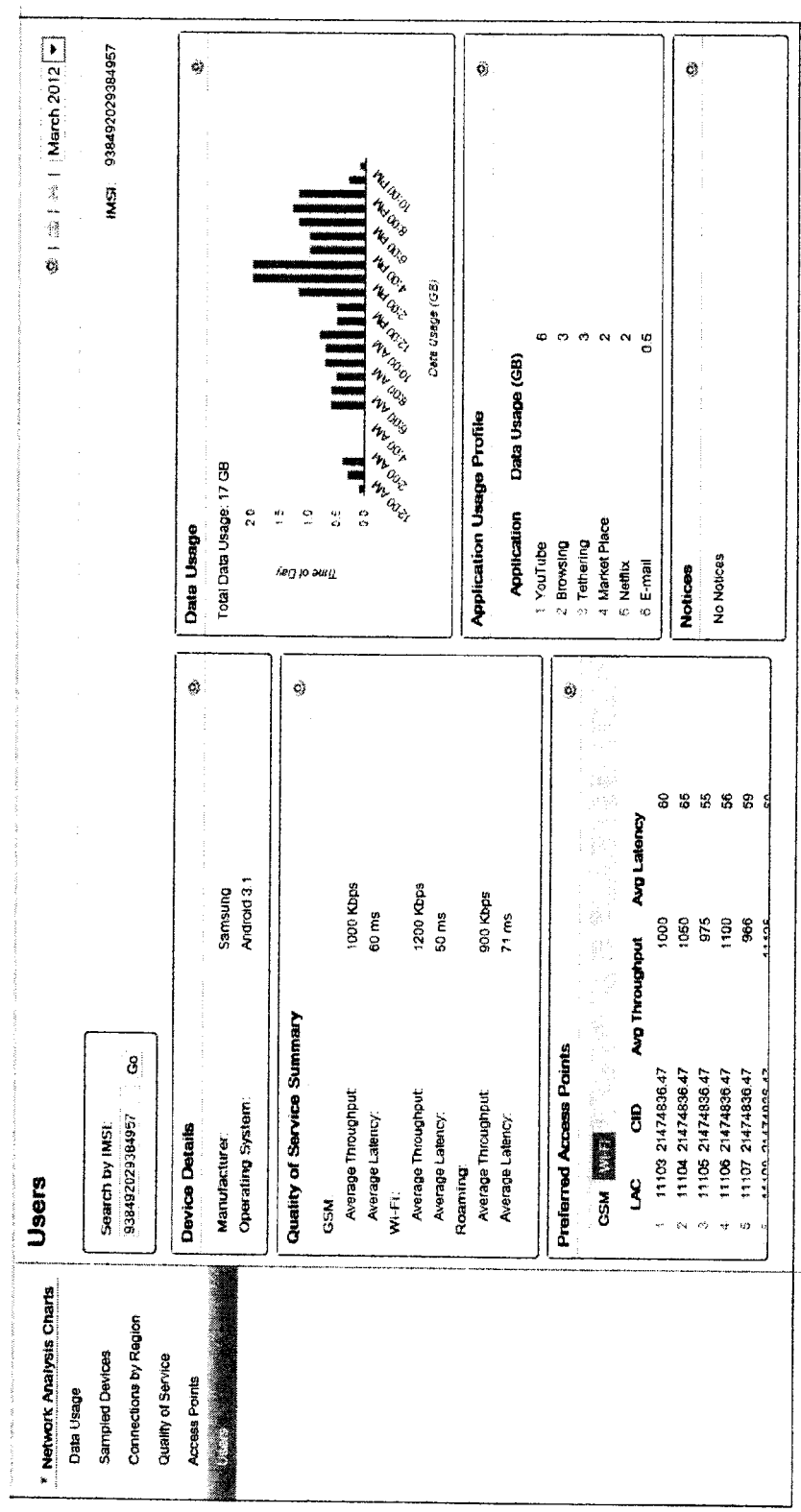

FIG. 19 shows a possible dashboard 115 user interface for showing the advanced details of a particular user.

Figure 20:
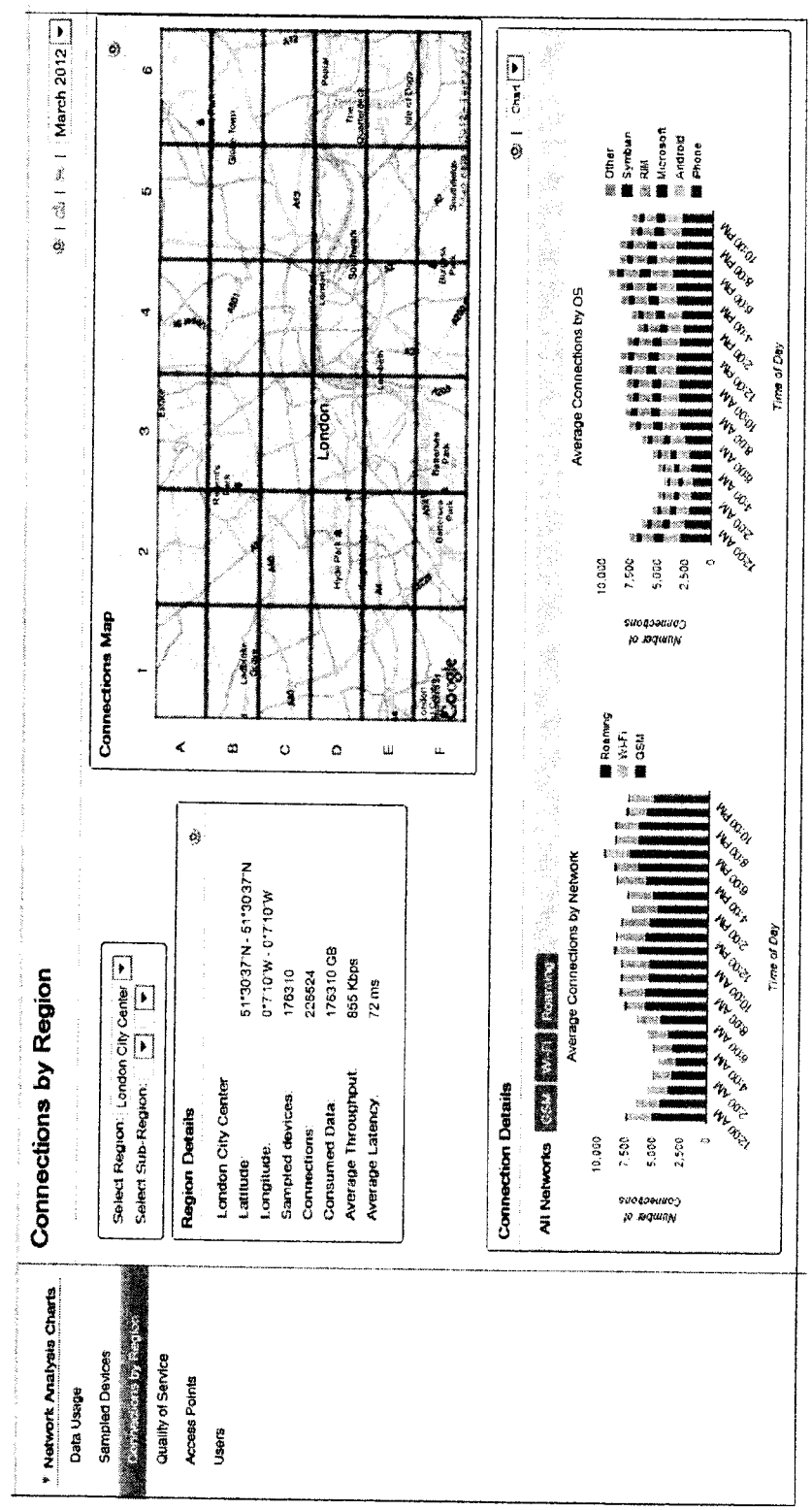

FIG. 20 shows a possible dashboard 115 user interface for showing how users connect.

All the servers mentioned may be viewed as being implemented in a cloud infrastructure. As well, the definition of device controllers includes, but is not limited to, systems that control the entity holding the device controller itself or alternatively entities that send control messages to various interconnected devices.

Although the discussion of the embodiment has been exemplified in the context of wireless networks, it will be understood that the embodiment can be applied to other fields where dynamic policy management brings benefits. For example, one such field is the management of electricity grids, where load management is critical. Moreover, in the manufacturing industry or the home more and more devices have intelligent controllers (for example, under the control of devices such as smart phones) and therefore dynamic policy control in accordance with the embodiment can be used to change policy in accordance with user habits and external variables, such as electricity tariffs.

It should be appreciated by those skilled in the art that any block diagrams herein represent conceptual views of illustrative circuitry embodying the principles of the embodiment. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. The term circuit is used herein to encompass functional blocks that may in practice be implemented in software.

The invention claimed is:

1. A system for regulating wireless device operation in wireless networks, comprising:
   a plurality of distributed wireless devices each having a profiling client resident thereon for collecting data about the local wireless operating environment for the associated wireless device, said wireless devices(s) being configured to communicate date relating to said wireless device operating environment back to the profiling server(s);

one or more profiling servers configured to receive data from the profiling clients and comprising one or more processors configured to dynamically aggregate and analyze the data received from the profiling clients to generate profiles for distribution by the profiling server(s) to a plurality of wireless devices;

wherein the wireless devices are responsive to said distributed profiles generated from the data received from the profiling clients to govern their wireless operations;

wherein said wireless devices operate in an environment in which access points are able to broadcast quality of service ratings to the wireless devices before they connect, which indicate an estimation of the quality of service that could be received should they connect; and wherein the profiling server(s) are further configured to generate profiles which guide what quality of service measures or ratings access points should indicate that they are able to provide to the wireless devices.

2. A system as claimed in claim 1, wherein said profiling clients (s) are configured to communicate data back to the profiling server(s) about wireless networks and environments and wherein the profiling server(s) are configured to analyze the received data to produce network and wireless environment assessments.

3. A system as claimed in 2, wherein the profiling server(s) are configured to use a composite of wireless device operation, wireless network, and wireless environment data to produce said profiles, and wherein said devices are responsive to said profiles to manage network-to-network access control and/or network utilization including preferences and priorities for establishing connections with specific networks and access points at specific times and/or under specific conditions.

4. A system as claimed in claim 3, wherein:
the profiling client is responsive to profiles generated by the profiling server to create or modify device operation policies, including data collection mechanisms, and said wireless device operations are responsive to these policies, and wherein said wireless devices are configured to communicate back to the profiling server(s) data regarding the impact of the profiles and/or the said policies on the device operations and/or operations of the profiling client.

5. A system as claimed in claim 4, further comprising a policy manager for issuing policies to said wireless devices and/or profiling clients and the wireless device(s) further comprise a device controller, which is responsive to policies to manage device operations, in communication with the profiling client and wireless device operating system.

6. A system as claimed in claim 1, wherein the profiling server(s) further comprise an interface to communicate profiles and assessments to analytic subscribers and the profiling server(s) further comprise a user interface accepting user input information to guide profile generation and/or modification, which in turn guides policy generation and/or modification by the profiling client and/or the profiling server(s) further comprise a user interface for communicating profiles and assessments to analytic subscribers and which also permit information to be input to the profiling server(s) to guide profile generation.

7. A system as claimed in claim 1, wherein the wireless device(s) comprise a connection manager, acting as a device controller, which is responsive to said policies and the wireless devices are mobile handsets and/or network access points.

8. A system as claimed in claim 1, wherein said wireless device(s) are configured to select the most appropriate of available Wi-Fi access points for subscriber devices and subscriber use patterns so as to enhance Wi-Fi network access or management processes.

9. A system as claimed in claim 1, wherein the system is configured to select the most appropriate access points for subscriber devices and subscriber use patterns to enhance cellular network offloading and/or on-loading processes.

10. A system as claimed in claim 1, wherein the policy manager is configured to manage policies for network-to-network access control and enhancing cellular network offload and/on-loading processes.

11. A system as claimed in claim 1, wherein the profiles have profile types and one of the profiles types generated by the profiling server guides the creation or modification of policies that indicate lists of priorities for specific network access point connections, each of which is relevant to specific user, device and environment conditions.

12. A method as claimed in claim 1, wherein the profiling servers analyze the received data to further produce network and wireless environment assessments that are communicated to analytics subscribers over a communication interface.

13. A method for regulating wireless device operations in wireless networks comprising a plurality of wireless devices whose operation is responsive to policies, a plurality of profiling clients on said devices whose operation is responsive profiles, one or more profiling servers in communication with said devices which generates profiles, and one or more policy managers in communication with said devices which contains a store of policies, the method comprising:
the profiling servers accepting data from more than one data source;
the profiling servers analyzing the accepted data to generate profiles;
the profiling servers communicating profiles to devices and profiling clients;
policy managers communicating policies to devices and profiling clients;
the profiling clients creating and/or modifying policies as governed by the profiles;
using said policies to govern wireless device operation;
communicating the performance of the profiles, policies, and device operation as data to the profiling servers, whereby the data communication processes are likewise governed by said profiles;
wherein said wireless devices operate in an environment in which access points broadcast quality of service ratings to the wireless devices before they connect, which indicate an estimation of the quality of service that could received should they connect; and
wherein the profiling server(s) generate profiles which guide what quality of service measures or ratings access points should indicate that they are able to provide to the wireless devices.

14. A method as claimed in claim 13, wherein the accepted data comprises at least one $3^{rd}$ party source; and the profiles are generated dynamically by analyzing data from the said $3^{rd}$ party source.

15. A method as claimed in claim 13, wherein the profiles are dynamically generated from one or more items selected from the group consisting of: a composite set of data amalgamated from a plurality of participating devices, a composite set of data amalgamated from one or more participating networks, a composite set of data amalgamated from a plurality of participating devices on a plurality of participating networks, and a composite set of data amalgamated from one or more of 3rd party data sources.

16. A method as claimed in claim 13, wherein the profiling server accepts a user-input information to guide profile generation and/or modification, which in turn guides policy generation and/or modification by the profiling client.

17. A profiling server for distributing profiles to profiling clients resident on wireless devices to govern the operation of devices and/or device controllers within a system containing multiple devices, comprising:
 an input for receiving a set of data from the profiling clients relating to the local wireless environment;
 one or more processors configured to aggregate and analyze the data to dynamically generate a set of profiles; and
 one or more profiling managers for distributing the set of profiles to remote profiling clients including access points that broadcast quality of service ratings to the wireless devices before they connect, which indicate an estimation of the quality of service that could be received should they connect; and
 wherein the profiling server(s) are further configured to generate profiles which guide what quality of service measures or ratings access points should indicate that they are able to provide to the wireless devices.

18. A profiling server as claimed in claim 17, wherein the profiling clients are located on devices selected from the group consisting of: access point data, location data, application data, device data, user data, and/or connection process data.

19. A profiling server as claimed in claim 17, wherein the profiling manager is further connected to a dashboard user interface for communicating human-readable information to/from the profiling server.

20. A profiling server as claimed in claim 17, further comprising a relationship engine for establishing relationships between the profiles to extract analytic value from data and a database for storing the extracted analytic value.

* * * * *